United States Patent
Furukawa et al.

(10) Patent No.: US 7,636,498 B2
(45) Date of Patent: Dec. 22, 2009

(54) IMAGE PROCESSING APPARATUS

(75) Inventors: Hideaki Furukawa, Akiruno (JP); Masaki Higurashi, Hachioji (JP); Akira Ueno, Akiruno (JP)

(73) Assignee: Olympus Corporation, Tokyo (JP)

( * ) Notice: Subject to any disclaimer, the term of this patent is extended or adjusted under 35 U.S.C. 154(b) by 658 days.

(21) Appl. No.: 10/558,994

(22) PCT Filed: May 31, 2004

(86) PCT No.: PCT/JP2004/007855
§ 371 (c)(1), (2), (4) Date: Dec. 1, 2005

(87) PCT Pub. No.: WO2004/109597
PCT Pub. Date: Dec. 16, 2004

(65) Prior Publication Data
US 2007/0025636 A1   Feb. 1, 2007

(30) Foreign Application Priority Data

| Jun. 2, 2003 | (JP) | ............................ 2003-157044 |
| Jun. 20, 2003 | (JP) | ............................ 2003-177290 |
| Jun. 20, 2003 | (JP) | ............................ 2003-177291 |

(51) Int. Cl.
*G06K 9/54* (2006.01)
(52) U.S. Cl. ..................... 382/303; 348/230.1; 345/647
(58) Field of Classification Search ................. 382/100, 382/302, 303; 345/647, 643, 644, 645, 674; 348/230.1, 228.1, 231.6, 231.99, 231.1, 231.3; 700/2, 4
See application file for complete search history.

(56) References Cited

U.S. PATENT DOCUMENTS

| 4,742,552 | A | * | 5/1988 | Andrews ..................... 382/303 |
| 5,608,864 | A | * | 3/1997 | Bindlish et al. ............. 345/558 |
| 5,889,500 | A | * | 3/1999 | Chuang et al. ................ 345/10 |
| 2001/0036322 | A1 | * | 11/2001 | Bloomfield et al. ......... 382/276 |
| 2002/0126917 | A1 | * | 9/2002 | Akiyoshi et al. ............ 382/300 |
| 2003/0123741 | A1 | * | 7/2003 | Ueno ......................... 382/239 |
| 2006/0188172 | A1 | * | 8/2006 | Higurashi et al. ........... 382/275 |

FOREIGN PATENT DOCUMENTS

| JP | 01-321574 | 12/1989 |
| JP | 05-207351 | 8/1993 |

(Continued)

*Primary Examiner*—Anand Bhatnagar
(74) *Attorney, Agent, or Firm*—Volpe and Koenig, P.C.

(57) ABSTRACT

An image processing apparatus applied to a digital camera, includes: a frame memory that inputs and stores, via a bus, image data obtained by capturing an optical image through an optical system by a CCD; a first data-order converting unit that reads and inputs the image data from the frame memory in units of a block in the row direction, and converts and outputs the image data in the column direction; an image processing unit that is connected to the first data-order converting unit for pipeline processing and performs image processing; a distortion correction processing unit that is connected to the image processing unit for pipeline processing and performs the distortion correction processing; and a second data-order converting unit that is connected to the distortion correction processing unit for pipeline processing, returns block data in the column direction into that in the row direction, and outputs the converted data to the frame memory.

18 Claims, 27 Drawing Sheets

FOREIGN PATENT DOCUMENTS

| | | |
|---|---|---|
| JP | 06-181530 | 6/1994 |
| JP | 09-259264 | 10/1997 |
| JP | 09-307789 | 11/1997 |
| JP | 10-224695 | 8/1998 |
| JP | 11-161773 | 6/1999 |
| JP | 11-275391 | 10/1999 |
| JP | 2000-311241 | 11/2000 |
| JP | 2000-312327 | 11/2000 |

\* cited by examiner

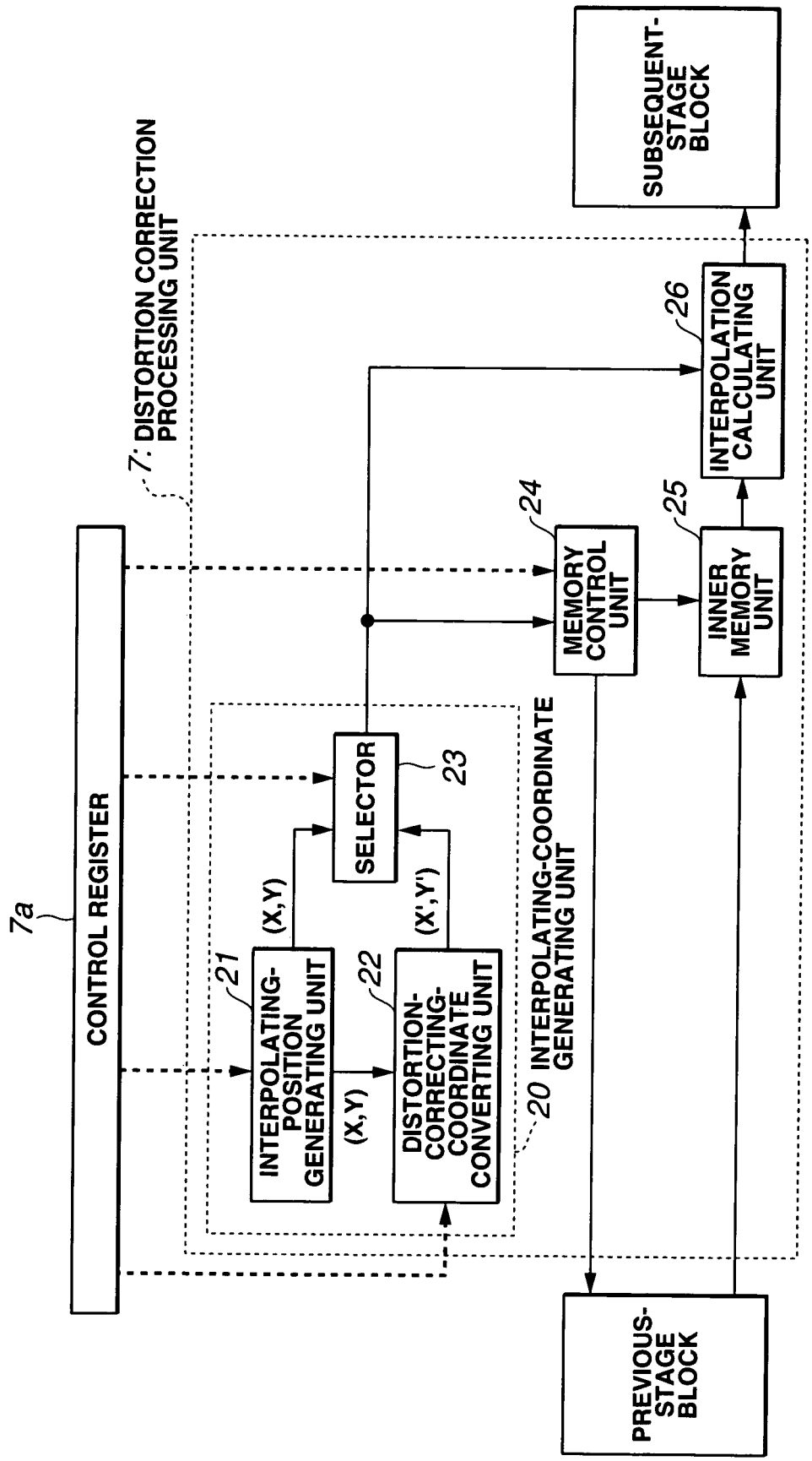

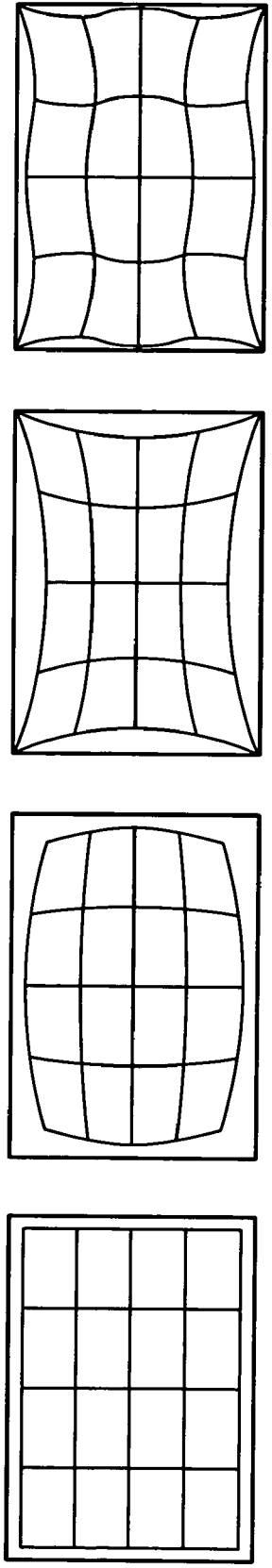
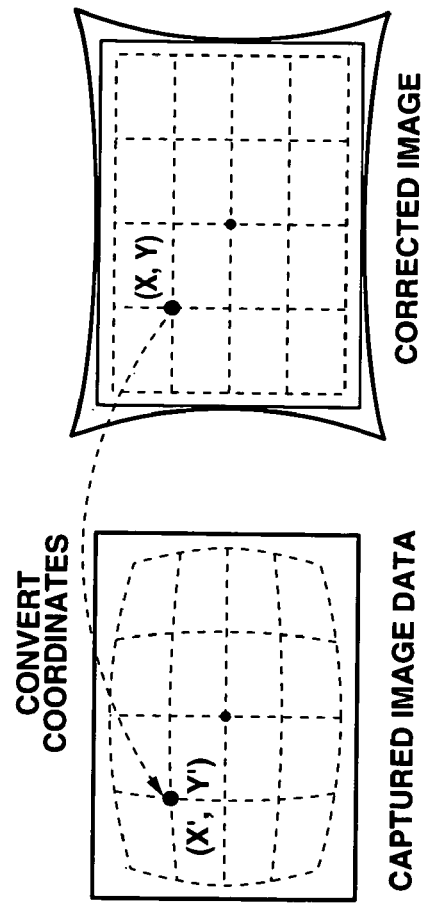

FIG.23A  R  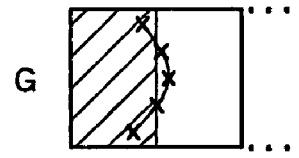
FIG.23B  G  
FIG.23C  B  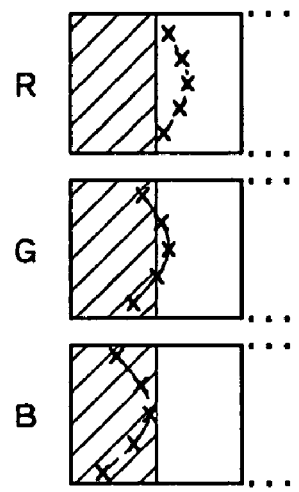
FIG.24A  R  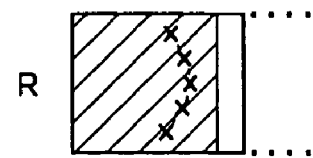
FIG.24B  G  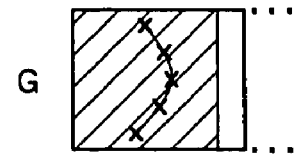
FIG.24C  B  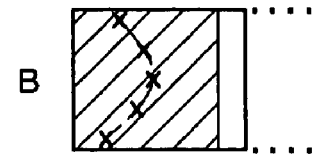

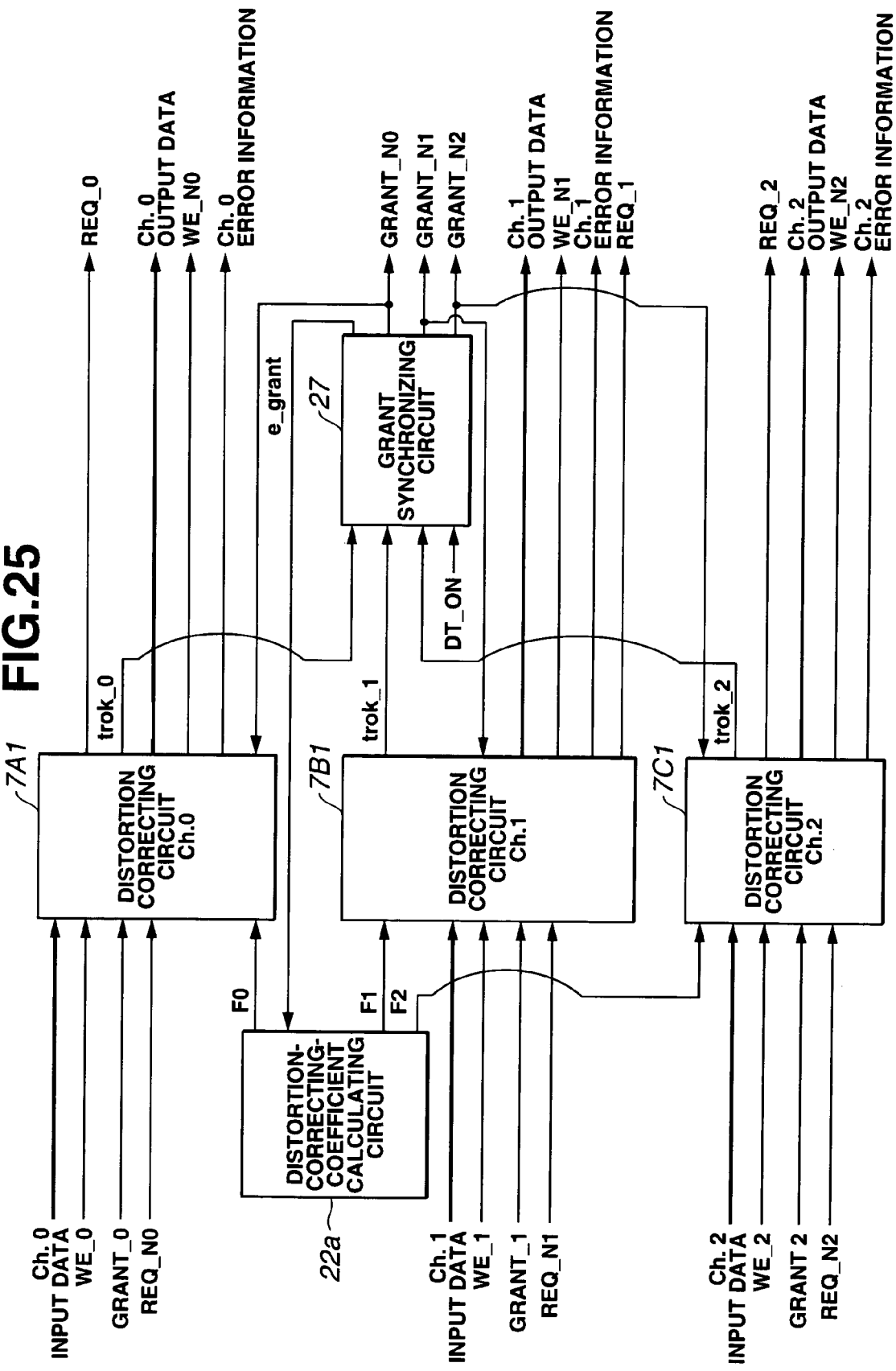

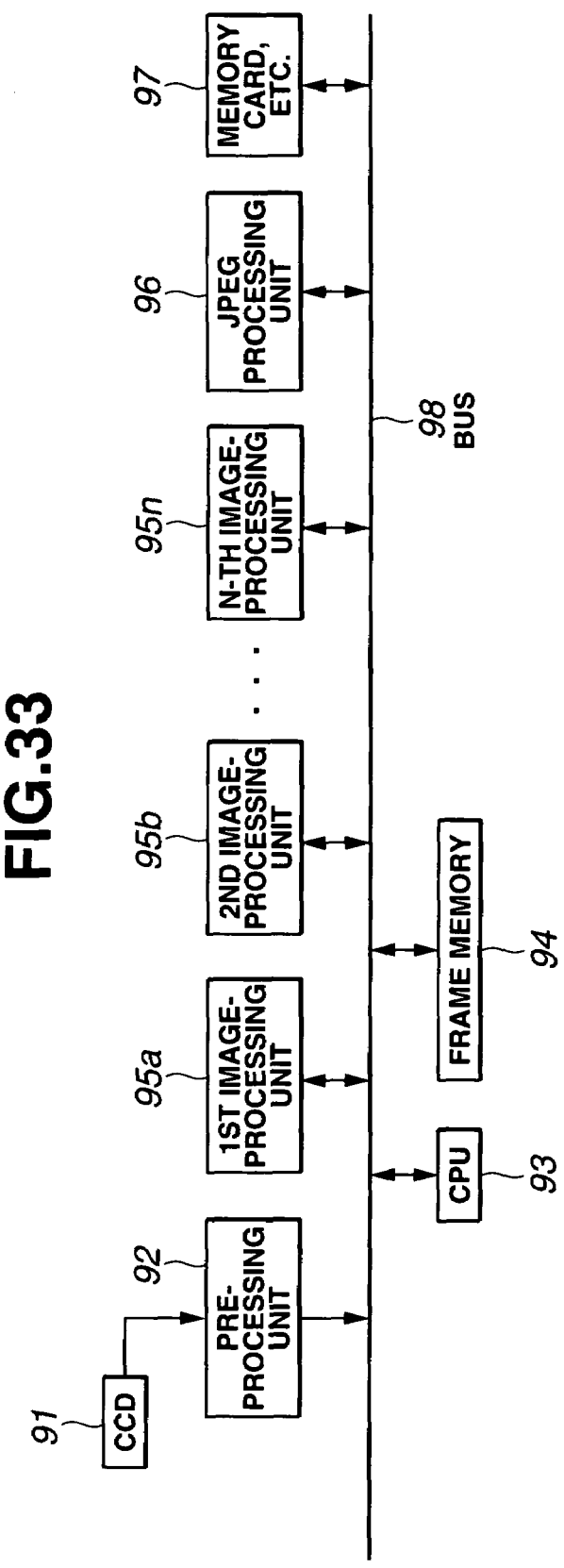

IMAGE PROCESSING APPARATUS

CROSS REFERENCE TO RELATED APPLICATION

This application is a continuation application of PCT/JP2004/007855 filed on May 31, 2004 and claims the benefit of Japanese Applications No. 2003-157044 filed in Japan on Jun. 2, 2003, No. 2003-177290 filed in Japan on Jun. 20, 2003, and No. 2003-177291 filed in Japan on Jun. 20, 2003 the entire contents of each of which are incorporated herein by their reference.

BACKGROUND OF THE INVENTION

1. Field of the Invention

The present invention relates to an image processing apparatus, and more particularly, to an image processing apparatus for processing electronic image data captured via an optical system.

2. Description of the Related Art

In general, in an electronic image pickup device, such as a digital camera, a subject image formed via an optical system is photoelectrically converted by an image pickup element, such as, a CCD, image pickup data is obtained, and the image pickup data is subjected to various image processing. Thereafter, generally, the image is compressed by JPEG compression format or the like, and is recorded to a recording medium, such as a memory card. The electronic image pickup device, such as a digital camera, has a common function of an image processing apparatus.

FIG. 32 is a diagram showing the general image-processing procedure in the image-processing apparatus.

An image pickup device, such as a CCD, photoelectrically converts an optical subject image which is formed by an optical system and generates an electrical image pickup signal. The image pickup signal is subjected to pre-processing, such as correction of pixel defect or A/D conversion and is thereafter stored in a frame memory.

Subsequently, image data stored in a frame memory is read and is subjected to various image processing including processing converting from a single-chip signal into a three-chip signal, low-pass filter processing, edge emphasis processing, and enlarging and reducing processing, through a first image process, a second image process, . . . , and an N-th image process.

An image signal after the image processing is compressed by JPEG compression format, and is recorded to a memory card, as an image file.

FIG. 33 is a block diagram showing the configuration of a conventional image processing apparatus for the general image processing shown in FIG. 32.

The image processing apparatus comprises: a CCD 91; a pre-processing unit 92; a frame memory 94; a first image-processing unit 95*a*; a second image-processing unit 95*b*; . . . ; an N-th image-processing unit 95*n*; a JPEG processing unit 96; a memory card 97; a bus 98 that connects the circuits except for the CCD 91 to a CPU 93, which will be described later; and the CPU 93 that entirely controls the image processing apparatus and includes the above-described circuits.

The image processing apparatus with the above-described configuration shown in FIG. 33 has a specific procedure as follows to perform the processing as shown in FIG. 32.

First, the image data from the pre-processing unit 92 is temporarily stored in the frame memory 94 via the bus 98.

Subsequently, the image data is read from the frame memory 94, is inputted to the first image processing unit 95*a* via the bus 98, and is subjected to the first image processing. The image data after the processing is written to the frame memory 94.

Similarly, the image data after the first image processing is read from the frame memory 94, is inputted to the second image processing unit 95*b* via the bus 98, and is subjected to the second image processing. The image data after the second processing is written to the frame memory 94. The same processing is repeated every image processing unit.

As mentioned above, in the image processing, the image data flows to the bus 98 many times. Since image data generally has a large data size, a load is imposed on the bus 98. The large load to the bus 98 is more serious in the use of continuous image pickup operation.

In the view of the foregoing, Japanese Unexamined Patent Application Publication No. 2000-311241 discloses a technology, by which a plurality of image processing units are connected for pipeline processing and images from a frame memory are subjected to the pipeline processing, thereby suppressing the bus's load. Thus, the bus's load is suppressed and the image processing including enlarging and reducing processing is performed in real time without increasing the memory capacity.

Further, Japanese Unexamined Patent Application Publication No. 2000-312327 discloses a technology, by which images stored in a frame memory are read in units of a block in a predetermined direction (column direction), thereby reducing the amount of buffer in the pipeline processing. Thus, an image processing apparatus with low power-consumption and memory-saving is configured.

In a camera optical system including a digital camera or a silver-halide camera, although varied, a distortion aberration is generally caused. In the case of capturing an image of a lattice subject, the distortion aberration is observed as a barrel image or pincushion image (refer to FIGS. 3A to 3C according to a first embodiment of the present invention). Currently-sold cameras have many types of optical zoom operation. With the zoom optical system, the focus distance is changed within a zoom range from the wide end to the tele-end and then the state of the distortion aberration changes in many cases.

In order to solve the phenomenon, Japanese Unexamined Patent Application Publication No. 6-181530 discloses one technology that is conventionally developed to correct the distortion, as a part of image processing. In the normal image processing as disclosed in Japanese Unexamined Patent Application Publication No. 6-181530, data is read in units of a line from a frame memory.

Further, Japanese Unexamined Patent Application Publication No. 10-224695 discloses as another technology for correcting the distortion as a part of image processing, wherein each image processing unit randomly accesses a frame memory. With the technology, since the image processing unit does not have a buffer, advantageously, the circuit scale of image processing unit is reduced.

Further, in the camera optical system, it is well-known that a chromatic aberration is caused. The chromatic aberration is caused because the refractive index is varied depending on the wavelength of light when light is incident on the optical system. In the case of forming an optical image through the optical system, the chromatic aberration appears, as a phenomenon of slight shift of optical images formed every wavelength. The optical system is designed such that the chromatic aberration is suppressed as much as possible. However, all the chromatic aberrations are not removed in view of arrangement space, weight, and costs.

As disclosed in Japanese Unexamined Patent Application Publication No. 6-181530, in order to perform a correction processing of the distortion of one line of corrected image, referring to FIG. 34, a plurality of lines necessary for distortion correction of the image data before the correction needs to be read throughout the width in the lateral direction of the entire image. FIG. 34 is a diagram for explaining the amount of memory necessary for conventional distortion correction processing. The image data of the plurality of lines is temporarily stored in the buffer arranged in the image processing unit, and is processed. Therefore, the buffer needs a relatively large capacity to obtain the corrected image of one line, the circuit scale increases, manufacturing costs increase, and the power consumption raises. Further, the processable image size is limited, depending on the capacity of buffer memory in the image processing unit.

Further, as disclosed in Japanese Unexamined Patent Application Publication No. 10-224695, the frame memory comprising an SDRAM and the like is randomly accessed and then the data transfer time increases the entire processing time, as compared with the burst transfer for reading operation from the SDRAM.

The image processing apparatus comprises both a processing block for the above-described distortion correction processing and a processing block for enlarging and reducing processing, thereby enabling both the enlarging and reducing processing and the distortion correction processing. However, both the processings need interpolation and calculation every pixel and the processing circuit has a large scale. Thus, mere adoption of the configuration having both the processing circuits increases the circuit scale. Further, the power consumption increases and the manufacturing costs raise.

Preferably, the above-described chromatic aberration is corrected without increasing the costs.

The present invention is devised in consideration of the above circumferences, and it is one object of the present invention to provide an image processing apparatus for image processing without increasing the amount of data transfer of bus and the memory capacity.

Further, it is another object of the present invention to provide an image processing apparatus having a small circuit scale for both the enlarging and reducing processing and the distortion correction processing with low power-consumption.

Furthermore, it is another object of the present invention to provide an image processing apparatus having a small circuit scale for both the correction of distortion and the correction of chromatic aberration with low power-consumption.

SUMMARY OF THE INVENTION

According to the present invention, an image processing apparatus for processing electronic image data obtained by image pickup operation via an optical system, having two-dimensionally-arranged pixel data in the row direction and the column direction, comprises: a memory that stores the image data at least before image processing and further stores the image data after the image procession; a first data-order converting unit that reads the pixel data in units of a block of the two-dimensional arrangement of the image data via a bus from the memory and thereafter outputs the pixel data in the block in the column direction; an image processing unit that is connected to the first data-order converting unit so that a pipeline processing can be performed via an information sending channel different from the bus, inputs the image data outputted in the column direction from the first data-order converting unit, performs the image processing, and thereafter outputs the image data in the column direction; and a second data-order converting unit that is connected to the image processing unit so that a pipeline processing can be performed, converts the image data outputted in the column direction from the image processing unit into the image data in the row correction, and outputs the converted image data.

Further, according to the present invention, an image processing apparatus for performing image processing, including distortion correction processing and enlarging and reducing processing, of electronic image data obtained by capturing an image via an optical system, comprises a distortion correction processing unit. The distortion correction processing unit comprises: an interpolating-coordinate generating unit that generates interpolating coordinate data, serving as coordinate data before interpolating processing, corresponding to the pixel position after the interpolating processing of the image processing including the distortion correction processing and the enlarging and reducing processing; a memory unit that stores at least a part of the image data; a memory control unit that controls the operation for partly writing the image data based on the interpolating coordinate data and controls the operation for reading the image data from the memory unit; and an interpolation calculating unit that calculates for interpolation the image data read from the memory unit under the control operation of the memory control unit to generate the image data at the pixel position after the interpolating processing.

Furthermore, according to the present invention, an image processing apparatus for processing electronic image data comprising a plurality of components obtained by capturing an image via an optical system, comprises distortion correction processing means. The distortion correction processing means comprises: distortion-correcting-coefficient calculating means that calculates, for every component, a distortion correcting coefficient used for correcting the distortion aberration due to the optical system based on the distance from the center of distortion; and distortion-correction calculating means that corrects the distortion of the image data every component by using the distortion correcting coefficient every component calculated by the distortion-correcting-coefficient calculating means.

BRIEF DESCRIPTION OF THE DRAWINGS

FIG. 2 is a block diagram showing the configuration of a distortion correction processing unit according to the first embodiment;

FIGS. 3A to 3D are diagrams showing examples of the distortion aberration in the case of capturing an image of a lattice-shaped subject via an optical system according to the first embodiment;

FIGS. 4A and 4B are diagrams for explaining the outline of interpolating processing including the distortion correction according to the first embodiment;

FIGS. 23A to 23C are diagrams showing the state of image data stored in an inner memory unit when interpolating data of B can be calculated according to the third embodiment;

FIGS. 24A to 24C are diagrams showing the state of image data stored in the inner memory unit when interpolating data of R, G, and B can be calculated according to the third embodiment;

FIG. 25 is a block diagram showing the detailed configuration of the distortion correction processing unit according to the third embodiment;

FIG. 32 is a diagram showing the sequence of general image processing in the image processing apparatus;

FIG. 33 is a block diagram showing the configuration of a conventional image processing apparatus for the general image processing shown in FIG. 32.

DESCRIPTION OF THE PREFERRED EMBODIMENT(S)

Hereinbelow, a description is given of embodiments of the present invention with reference to the drawings.

Figure 1:
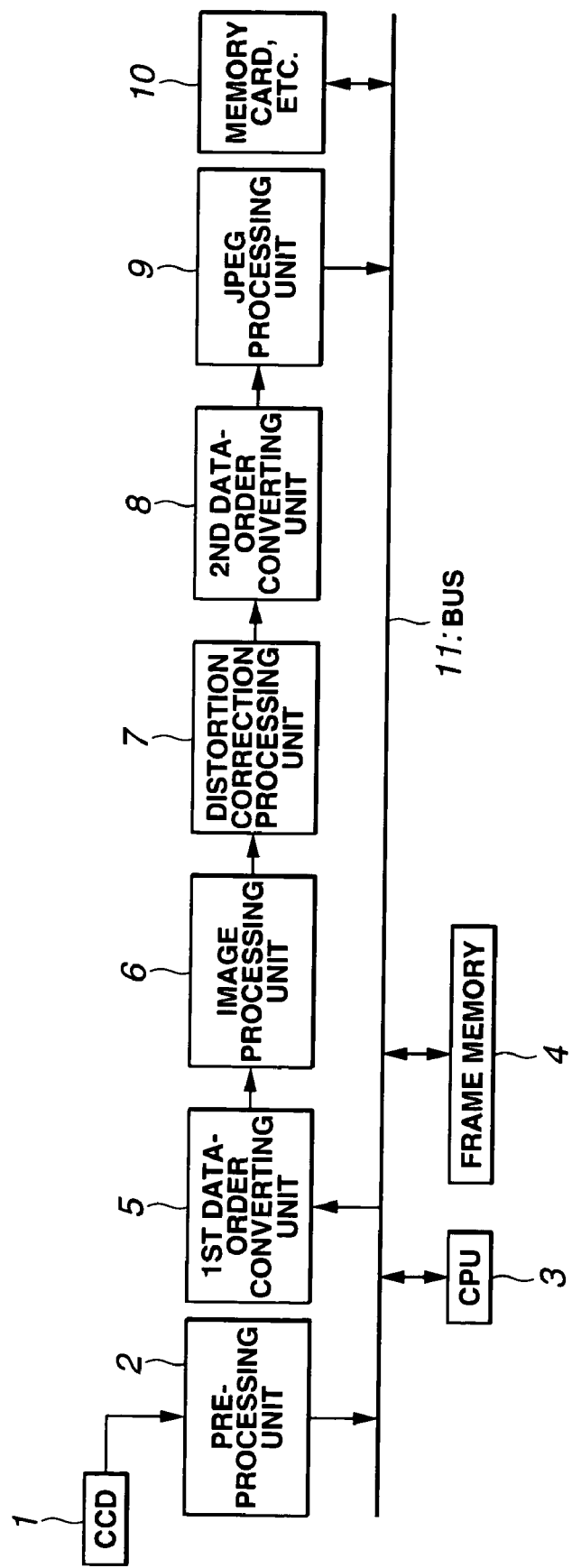
FIG. 1 is a block diagram showing the configuration of an image processing apparatus according to a first embodiment of the present invention.

FIGS. 1 to 14 show a first embodiment of the present invention. FIG. 1 is a block diagram showing the configuration of an image processing apparatus.

The image processing apparatus comprises: a CCD 1, serving as an image pickup element, which photoelectrically converts an optical subject image formed by an optical system and generates an electrical image pickup signal; a pre-processing unit 2 which performs pre-processing, such as correction of pixel defect or A/D conversion of the image pickup signal outputted from the CCD 1; a frame memory 4 which stores a frame image after procession by the pre-processing unit 2; a first data-order converting unit 5 which reads image data stored in the frame memory 4 every predetermined block via a bus 11, which will be described later, temporarily stores the data, and thereafter changes the reading order and outputs the data; an image processing unit 6, serving as an image processing unit, which performs predetermined image processing of the image data outputted from the first data-order converting unit 5; a distortion correction processing unit 7, serving as an image processing unit, which corrects the distortion of the image data after procession by the image processing unit 6; a second data-order converting unit 8 which temporarily stores every block the image data outputted from the distortion correction processing unit 7, and reads and outputs the data in the same direction as that read from the frame memory 4 by the first data-order converting unit 5; a JPEG processing unit 9 which compresses the image data outputted from the second data-order converting unit 8 by a compression format, such as JPEG; a memory card 10, serving as non-volatile storage means, which temporarily writes the image data compressed by the JPEG processing unit 9 via the bus 11, which will be described later, reads and inputs the written image data via the bus 11, and stores the data as an image file; the bus 11 which connects the circuits except for the CCD 1 to a CPU 3, which will be described later; and the CPU 3, serving as control means, which entirely controls the image processing apparatus including the above-described circuits.

Here, the first data-order converting unit 5 to the JPEG processing unit 9 are connected such that a pipeline processing can be performed via an information transmitting channel different from the bus 11, not via the bus 11. The image data is transferred in units of a predetermined block in the two-dimensional pixel arrangement and then is processed. Thus, the image data having the large amount of data is not transferred via the bus 11 every time for every process. Therefore, the load of the bus 11 is excessively reduced, and the processing is performed every block, thereby reducing the capacity of a buffer unit in the image processing unit.

In the example shown in FIG. 1, one image processing unit 6 for image processing is arranged. Further, a plurality of image processing units corresponding to a plurality of image processing may be arranged on a channel of the pipeline processing. Similarly as above, the image processing may be a converting processing from a single-chip signal to a three-chip signal, low-pass filter processing, edge emphasis processing, or enlarging and reducing processing. In this case, the image processing unit 6 may be arranged to the previous-stage portion or subsequent-stage portion of the distortion correction processing unit 7.

FIG. 2 is a block diagram showing the configuration of the distortion correction processing unit 7.

The distortion correction processing unit 7 receives the image data from the previous-stage processing block in units of a predetermined block, corrects the distortion of data, and thereafter outputs the data to the subsequent-stage processing block. In the example of the configuration shown in FIG. 1, the previous-stage processing block corresponds to the image processing unit 6, and the subsequent-stage processing block corresponds to the second data-order converting unit 8.

The distortion correction processing unit 7 additionally has a control register 7a, to which a setting value of the distortion correction processing unit 7 from the CPU 3 or various data is set, and which simultaneously reads the status of the processing result from the CPU 3.

Figure 5:
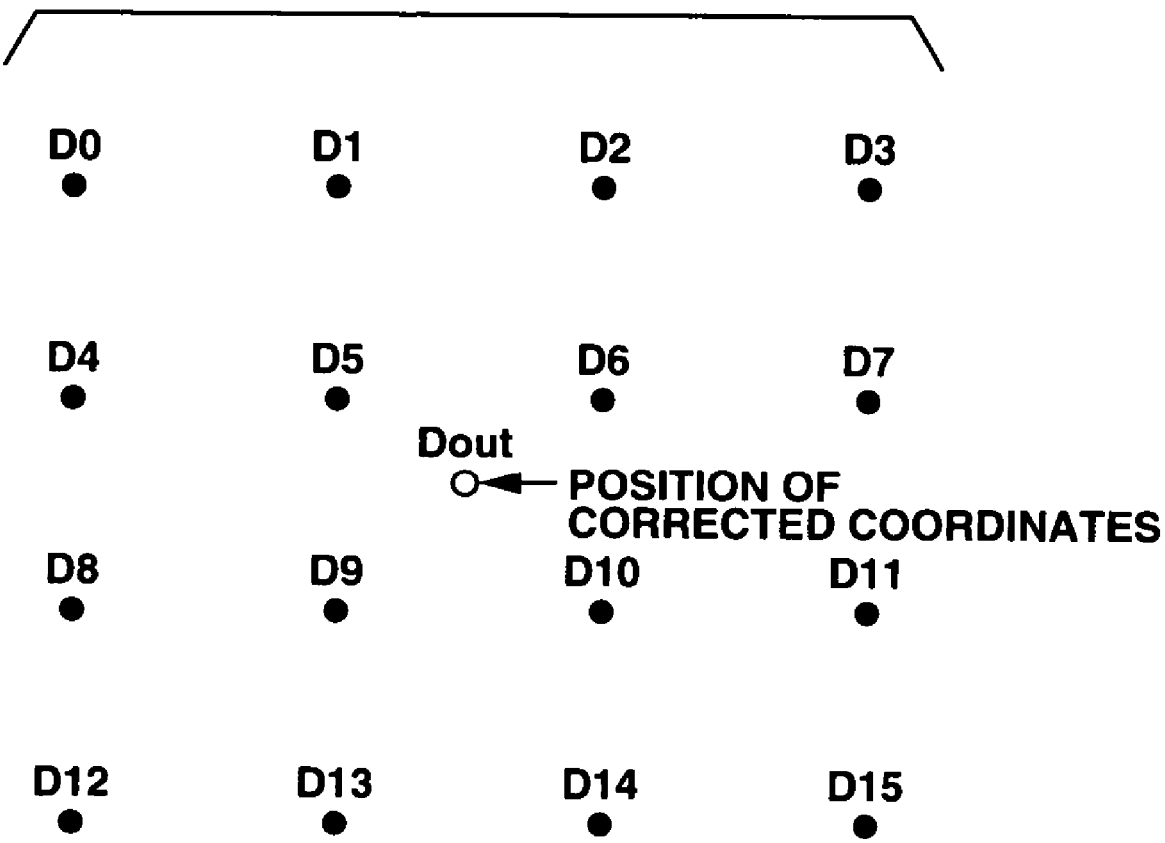
FIG. 5 is a diagram for explaining processing using 16-point interpolation according to the first embodiment.

The processing outline of the distortion correction processing unit 7 is as follows, as shown in FIGS. 4A, 4B and 5. FIGS. 4A and 4B are diagrams for explaining the outline of interpolating processing including the distortion correction. FIG. 5 is a diagram for explaining the 16-point interpolation processing.

Referring to FIG. 4B, a coordinate system (X, Y) of the image after procession of the distortion correction is prepared. The image data at the coordinate system (X, Y) is not obtained before starting the distortion correction processing.

A target point (pixel of interest) at the coordinate system (X, Y) (corresponding to the coordinate of the pixel of the image after procession of the distortion correction, referred also to as (X, Y)) is set. The coordinates (X', Y') of the image data corresponding to the target point (X, Y) (interpolating coordinate data) are obtained by the coordinate conversion (refer to FIG. 4A). A corresponding relationship between the coordinates (X, Y) and the coordinates (X', Y') is determined depending on the optical nature of the optical system for forming the subject image on the CCD 1. A parameter and the like for defining the corresponding relationship is obtained in advance based on a design value of the optical system or the inspection of the optical system after manufacturing, and is stored in a non-volatile memory (not shown). The CPU 3 reads the parameter from the non-volatile memory and sets the read parameter to the control register 7a.

The coordinates (X', Y') are obtained by the corresponding relationship as mentioned above, thereby determining the coordinates of peripheral image data necessary for obtaining the image data at the coordinates (X', Y'). Referring to FIG. 5, in the case of Cubic interpolating processing, coordinates of 16 points in the neighborhood are determined for the coordinates (X', Y') (point having image data $D_{out}$ in FIG. 5).

The image data $D_{out}$ at the coordinates (X', Y') shown by a white circle is obtained by using a predetermined interpolating formula based on image data D0 to D15 of the coordinates of the 16 points, thereby obtaining the image data at the target point (X, Y) of the image after procession of the distortion correction.

All image data within the necessary range is calculated while moving the target point (X, Y), thereby generating the image data after the distortion correction.

Referring to FIG. 2, the distortion correction processing unit 7 comprises: an interpolating-position generating unit 21 that generates the coordinates (X, Y) of the target point; a distortion-correcting-coordinate converting unit 22 that calculates the coordinates (X', Y') of the image data before procession of the distortion correction from the coordinates (X, Y) of the target point generated by the interpolating-position generating unit 21; a selector 23 that selects the coordinates (X, Y) outputted from the interpolating-position generating unit 21 in the case that the distortion correction processing is not performed and selects the coordinates (X', Y') outputted from the distortion-correcting-coordinate converting unit 22 in the case that the distortion correction processing is performed; a memory control unit 24 that controls the reading operation of the image data from the previous-stage processing block and further controls an inner memory unit 25, which will be described later, so as to send the image data of the peripheral pixels necessary for performing interpolating processing on the coordinates outputted from the selector 23; the inner memory unit 25 that stores the image data from the previous-stage processing block and outputs the image data of the peripheral pixels necessary for interpolation under the control of the memory control unit 24 to an interpolation calculating unit 26, which will be described later; and the interpolation calculating unit 26 that obtains the image data at the target point based on the image data in the neighborhood of the target point outputted from the inner memory unit 25 and the coordinates of the target point outputted from the selector 23 by using Cubic interpolation or the like as mentioned above and outputs the obtained data to the subsequent-stage processing block.

In the configuration blocks, the interpolating-position generating unit 21, the distortion-correcting-coordinate converting unit 22, and the selector 23 constitute an interpolating-coordinate generating unit 20.

The interpolating-position generating unit 21 calculates the coordinates of the target point (X, Y) for interpolation by using an interpolating start position ($X_{ST}$, $Y_{ST}$) set by the control register 7a from the CPU 3 and an interpolating step ($\Delta X$, $\Delta Y$), as shown by the following Formula 1.

$$\begin{cases} X = X_{ST} + k \times \Delta X \\ Y = Y_{ST} + l \times \Delta Y \end{cases} \quad \text{[Formula 1]}$$

where k: variable incremented upon moving the target point by $\Delta X$ in the X direction, and l: Variable Incremented Upon Moving the Target Point by $\Delta Y$ in the Y Direction.

Incidentally, the interpolating start position ($X_{ST}$, $Y_{ST}$) can be set at an arbitrary position in the image. Further, the interpolating step ($\Delta X$, $\Delta Y$) can be properly set by the CPU 3, thereby enlarging and reducing the image.

The distortion-correcting-coordinate converting unit 22 calculates the coordinates (X', Y') of the target point before procession of the distortion correction from the coordinates (X, Y) of the target point after procession of the distortion correction outputted from the interpolating-position generating unit 21.

That is, intermediate calculated values (X (dot), Y (dot)) (here, the point on the character is referred to as "dot" in the document) are obtained as shown by the following formula 2 by using coordinates ($X_d$, $Y_d$) of the position of the distortion center in the image constituting the processing target, the amount ($X_{off}$, $Y_{off}$) of correction for the shift from the center for correcting the shift of the position of the subject from that at the image pickup time due to the distortion correction after procession of the distortion correction, and a range correcting magnification M for correcting the out-of-range or shortage from the necessary range of the image data after procession of the correction in the case of the distortion correction processing using the parameter indicating the optical property of the optical system.

$$\begin{cases} \dot{X} = M \cdot (X - X_d) + (X_d + X_{off}) \\ \dot{Y} = M \cdot (Y - Y_d) + (Y_d + Y_{off}) \end{cases} \quad \text{[Formula 2]}$$

where ($X_d$, $Y_d$): coordinates of the position of the distortion center, corresponding to the coordinates of the position on the image on which the optical axes of the optical system for forming the subject optical image to the CCD 1 intersect.

The CPU 3 sets, to the control register 7a, the coordinates ($X_d$, $Y_d$) of the position of the distortion center, the amount ($X_{off}$, $Y_{off}$) of correction for the shift from the center, and the magnification M for correcting the range.

Next, a distance Z from the central position of distortion (specifically, the square of Z) is calculated as shown by the following formula 3 by using the obtained calculated value (X (dot), Y (dot)), the coordinates ($X_d$, $Y_d$) of the position of the distortion center, and coefficients for correcting the different spatial sampling in the longitudinal direction and the lateral direction in the case of thinning-out to capture the image data.

$$Z^2 = \{S_{X'}(\dot{X}-X_d)\}^2 + \{S_{Y'}(\dot{Y}-Y_d)\}^2 \quad \text{[Formula 3]}$$

The coordinates (X', Y') of the target point before procession of the distortion correction corresponding to the coordinates (X, Y) of the target point after procession of the distortion correction are calculated as shown by the following formula 4 by using the above-calculated Z, the distortion correcting coefficients A, B, C, D, and E, serving as the parameters indicating the optical property on the distortion aberration of the optical system set to the control register 7a from the CPU 3, the calculated values (X (dot), Y (dot)), the coordinates ($X_d$, $Y_d$) of the position of the distortion center.

$$\begin{cases} X' = (\dot{X} - X_d) \cdot [1 + A \cdot Z^2 + B \cdot Z^4 + C \cdot Z^6 + D \cdot Z^8 + E \cdot Z^{10} + \cdots ] + X_d \\ Y' = (\dot{Y} - Y_d) \cdot [1 + A \cdot Z^2 + B \cdot Z^4 + C \cdot Z^6 + D \cdot Z^8 + E \cdot Z^{10} + \cdots ] + Y_d \end{cases} \quad \text{[Formula 4]}$$

Here, FIGS. 3A to 3D are diagrams showing examples of the distortion aberrations upon capturing the image of the lattice subject via the optical system. Referring to FIG. 3A shows an example of a lattice subject. Since the conventional art considers up to the term of second degree, a barrel distortion aberration shown in FIG. 3B and a pincushion distortion aberration shown in FIG. 3C, which are caused upon capturing the image of the subject shown in FIG. 3A via the optical system, can be corrected. But, a curvilinear distortion aberration shown in FIG. 3D cannot be corrected. However, according to the first embodiment, as shown by the Formula 4, the degree up to that over the term of second degree of Z, that is, the term of fourth degree or the term of sixth degree is considered. Thus, it is possible to precisely correct the aberration to a high degree as mentioned above. Further, the term of the still higher degree may be considered.

The coordinates (X, Y) calculated by the interpolating-position generating unit 21 or the coordinates (X', Y') calculated by the distortion-correcting-coordinate converting unit 22 are inputted to the selector 23. The selector 23 selects the necessary coordinates depending on as whether or not the distortion correction is to be processed.

The interpolation calculating unit 26 reads from the inner memory unit 25 the image data $D_0$ to $D_{15}$ of the pixels in the neighborhood of the coordinates based on the coordinates outputted from the selector 23, calculates the image data $D_{out}$ after procession of distortion correction on the target point by using the following Formula 5, and outputs the calculated result to a subsequent-stage processing block.

$$\begin{aligned} D_{out} = & k_{x0}(k_{y0}D_0 + k_{y1}D_4 + k_{y2}D_8 + k_{y3}D_{12}) + \\ & k_{x1}(k_{y0}D_1 + k_{y1}D_5 + k_{y2}D_9 + k_{y3}D_{13}) + \\ & k_{x2}(k_{y0}D_2 + k_{y1}D_6 + k_{y2}D_{10} + k_{y3}D_{14}) + \\ & k_{x3}(k_{y0}D_3 + k_{y1}D_7 + k_{y2}D_{11} + k_{y3}D_{15}) \end{aligned} \quad \text{[Formula 5]}$$

where $k_{x0}$ to $k_{x3}$ and $k_{y0}$ to $k_{y3}$: interpolating coefficients predetermined in the Cubic interpolation, for example.

Figure 6:
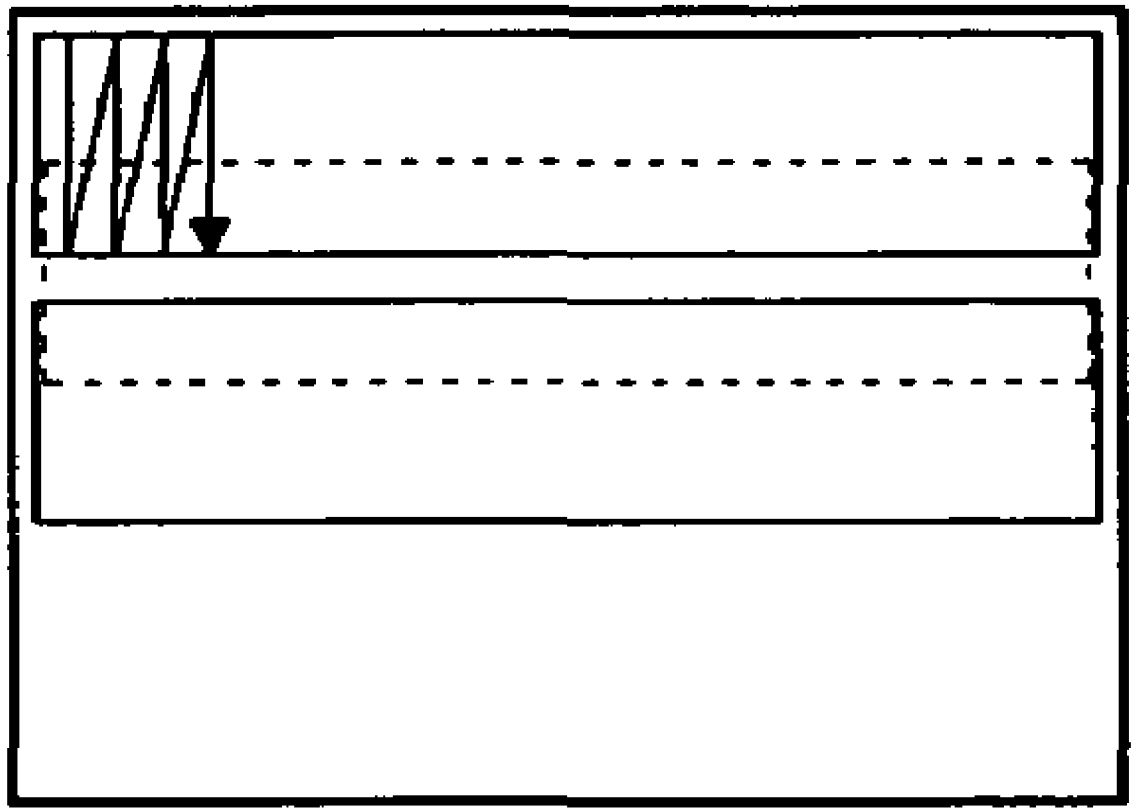
FIG. 6 is a diagram showing the reading order of image data according to the first embodiment.

FIG. 6 is a diagram showing the reading order of the image data according to the first embodiment.

The image data is generally read in the line direction, that is, row direction. Typically, all image data of one line is read, and all the image data of the next line is read, and in this manner the reading operation is repeated.

On the contrary, the image processing apparatus according to the first embodiment reads the image data corresponding to a predetermined length in the row direction, then, moves to the next row and reads the image data corresponding to a predetermined length, and sequentially outputs the image data having a predetermined number of rows in the column direction, thereby converting the data order such that the image data is read in the longitudinal direction in units of a predetermined block. A predetermined length in the row direction is determined based on the unit of a width of the image data readable at high speed from the frame memory 4.

The subsequent read block is a block adjoining in the row direction (next on the right in FIG. 6). The next group of blocks is read such that the group of blocks is slightly shifted at the right end of the image data to be overlapped to the read blocks in the longitudinal direction. The image data necessary for generating the adjoining data in the row direction (lateral direction) outputted by the second data-order converting unit 8 is partly overlapped. Therefore, the first data-order converting unit 5 needs to read the image data in consideration of the overlapped data.

Since a read command of the image data is sequentially issued, actually, the image data is continuously read in units of a block. The data in the rectangular portion elongated in the row direction in FIG. 6 continuously flows in the longitudinal direction, as shown by a solid arrow.

Figure 7A:
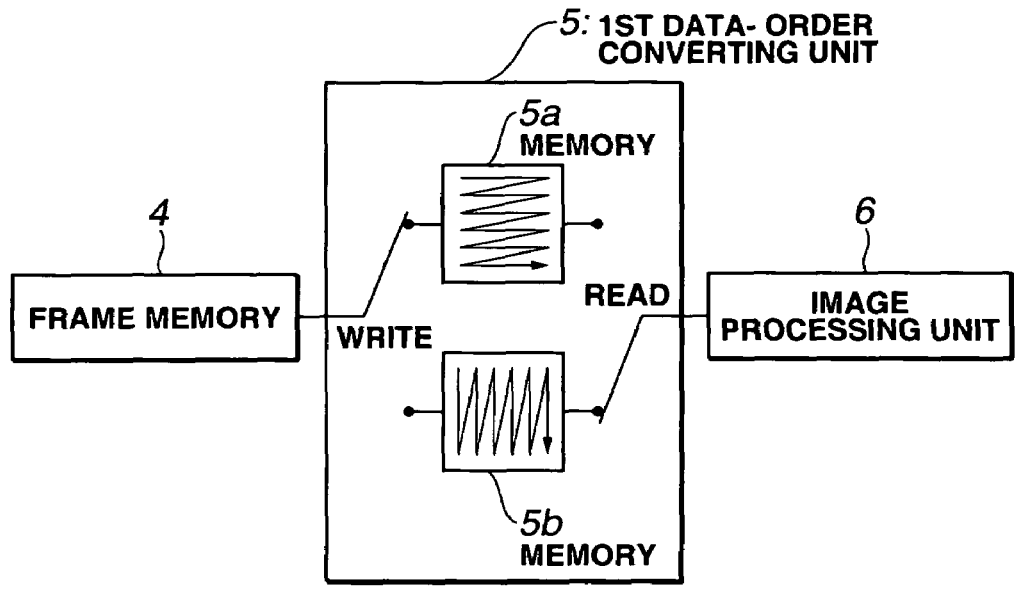
FIGS. 7A and 7B are block diagrams showing the configuration of a data order converting unit according to the first embodiment.
Figure 7B:
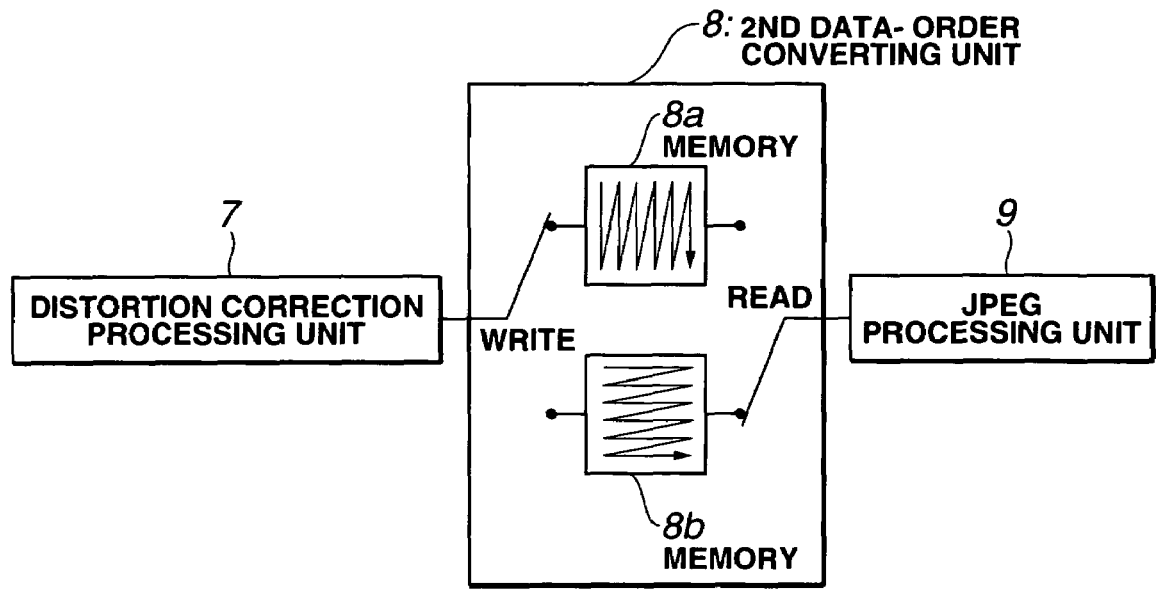

A description is given of the configuration of the first data-order converting unit 5 and the second data-order converting unit 8 that perform the reading operation of the image data as mentioned above with reference to FIGS. 7A and 7B. FIGS. 7A and 7B are block diagrams showing the configuration of the data-order converting unit.

Referring to FIG. 7A, the first data-order converting unit 5 comprises a plurality of memories for storing the image data in units of a block and, here, comprises two memories of memories 5a and 5b. The frame memory 4 is switchably connected to the memories 5a and 5b, and the image processing unit 6 is also switchably connected to the memories 5a and 5b. When the frame memory 4 is connected to one of the memories 5a and 5b, another memory is switchably connected to the image processing unit 6. That is, the memories 5a and 5b are switched so as to prevent the simultaneous connection to the frame memory 4 and the image processing unit 6.

The frame image stored in the frame memory 4 is partly read in the line direction in units of a block, and is stored in one of the memories, e.g., the memory 5a here.

In parallel therewith, the image data read in units of a block from the frame memory 4 and stored in the memory 5b is sequentially read in the column direction (longitudinal direction), and is outputted to the image processing unit 6.

After ending the writing operation from the frame memory 4 to the memory 5a and the reading operation from the memory 5b to the image processing unit 6, the switch on the writing side and the switch on the reading side are switched. Then, the next image data in units of a block starts to be written from the frame memory 4 to the memory 5b. The image data in units of a block starts to be read from the memory 5a to the image processing unit 6.

Referring to FIG. 7B, the second data-order converting unit 8 has the same configuration as that of the first data-order converting unit 5, and operates similarly to the first data-order converting unit 5.

That is, the second data-order converting unit 8 comprises memories 8a and 8b.

In the operation of the second data-order converting unit 8, the image data is written from the distortion correction processing unit 7 to one of the memories 8a and 8b in the column direction (longitudinal direction). The image data is read from another memory in the row direction (lateral direction) and is outputted to the JPEG processing unit 9.

Figure 8:
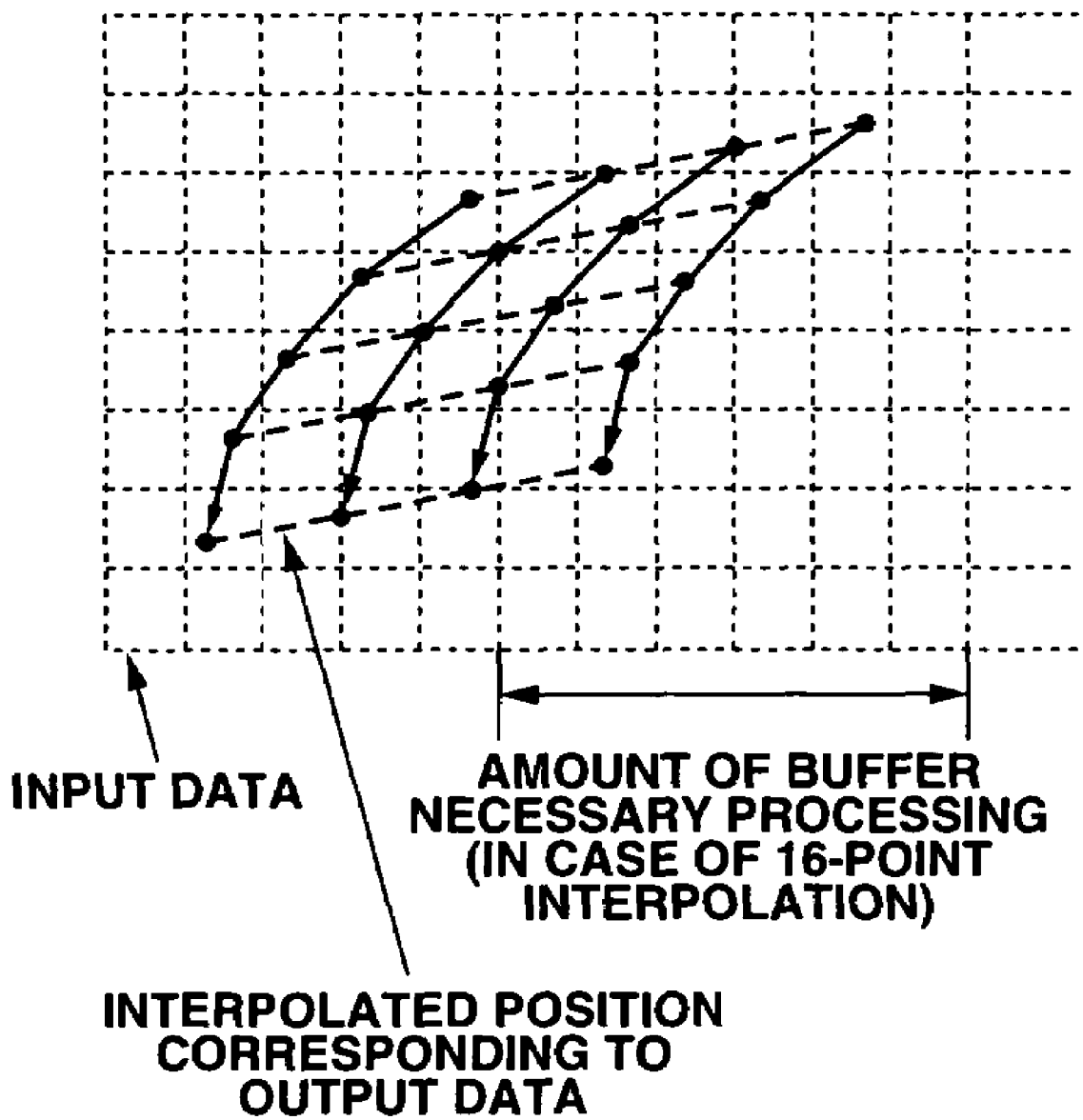
FIG. 8 is a diagram showing a corresponding relationship between a corrected image and a captured image and the amount of buffer necessary for processing-according to the first embodiment.

The amount of buffer necessary as the inner memory unit 25 shown in FIG. 2 is as shown in FIG. 8. FIG. 8 is a diagram showing a corresponding relationship between the corrected image and the captured image and the amount of buffer necessary for processing.

A point at which broken lines cross to each other in FIG. 8 shows the image data inputted to the distortion correction processing unit 7 from the image processing unit 6 (that is, image data before procession of the distortion correction, and further, image data to be read from the frame memory 4). A black point shows coordinates (X', Y') of the target point before procession of the distortion correction, calculated from the coordinates (X, Y) after procession of the distortion correction, and further shows a plurality of points, as processing targets (point comprising 4 (lateral)×5 (longitudinal) dots in the example shown in FIG. 8). These points are subjected to, e.g., the distortion correction processing in units of 5 dots arranged in the longitudinal direction. For example, the amount of buffer necessary for processing 5 dots (in the longitudinal direction) on the most right in the block comprising 4 (in the lateral direction)×5 (in the longitudinal direction) (5 dots arranged on a thick solid line in FIG. 8) corresponds to a range as shown by an arrow in FIG. 8, that is, a block of input image data comprising 9 (in the longitudinal direction)×7 (in the lateral direction) dots. Incidentally, the image data on 16 points around the target point is necessary in the Cubic interpolation, and the necessary amount of buffer changes upon changing the interpolating method.

Of course, the size (storage capacity) of the buffer (inner memory unit 25) needs to be ensured as the size for interpolating four corners of an image with the largest distortion aberration.

Figure 9:
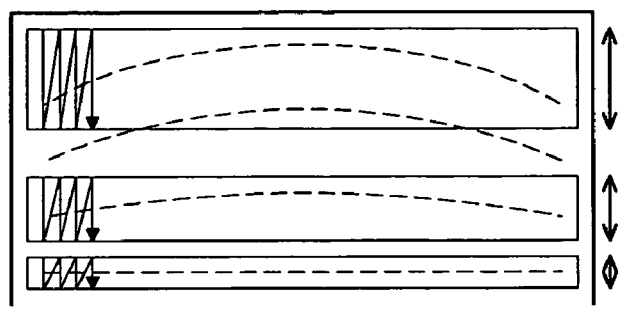
FIG. 9 is a diagram showing an example of varying, in the longitudinal direction, the width of read image data, depending on the distance of the center of distortion according to the first embodiment.

Further, in the example shown in FIG. 6, the number of pixels read in the longitudinal direction is equal at any position in the frame screen. However, the present invention is not limited to this and, referring to FIG. 9, the number of pixels read in the longitudinal direction may be varied depending on the position. FIG. 9 is a diagram showing an example of varying in the longitudinal direction the width of image data read in accordance with the distance from the center of distortion. That is, the distortion due to the distortion aberration increases as the position is far from the center of distortion. On the contrary, the distortion due to the distortion aberration decreases as the position is closer to the center of distortion. Therefore, the number of pixels read in the longitudinal direction is increased at the position far from the center of distortion. The number of pixels read in the longitudinal direction at the position close to the center of distortion is decreased. Then, the processing speed increases.

Figure 10:
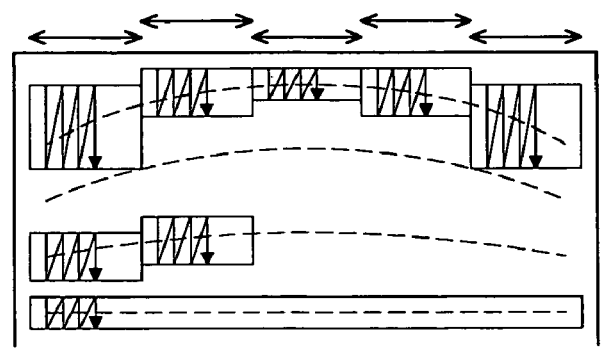
FIG. 10 is a diagram showing an example of varying the size of read image data and reading start position, depending on the distance from the center of distortion according to the first embodiment.

FIG. 10 is a diagram showing an example of varying the size of the image data read in accordance with the distance from the center of distortion and the reading start position. In the example shown in FIG. 10, the number of pixels read in the longitudinal direction is varied depending on the position in the lateral direction, and the reading start position of the image data is changed in units of a block.

That is, in the example in which the center of distortion is in the center of the screen, on the same line, the position near the center position is close to the center of distortion, and the position near the left and right ends is far from the center of distortion. Therefore, the number of pixels read in the longitudinal direction is reduced in the center position near the center of distortion, and the number of pixels is increased at the left and right ends far from the center of distortion. Further, in the case of causing a barrel distortion aberration shown in the FIG. 3A, corresponding to the shape of curve based on the distortion aberration, at the left and right ends, the reading start position of the image data in units of a block is slightly upper position of the longitudinal direction. At the center position, the reading start position of the image data in units of a block is slightly lower position of the longitudinal direction. Here, the barrel distortion aberration is caused as an example. Even when a pincushion distortion aberration or a curvilinear distortion aberration is caused, corresponding to the caused shape of distortion, the number of pixels read can be changed.

Incidentally, in the reading block, the number of pixels read may be varied in the longitudinal direction and further may be varied in the lateral direction.

In the foregoing, the distortion of image data after procession by the image processing unit 6 is corrected. However, the present invention is not limited to this.

Figure 11:
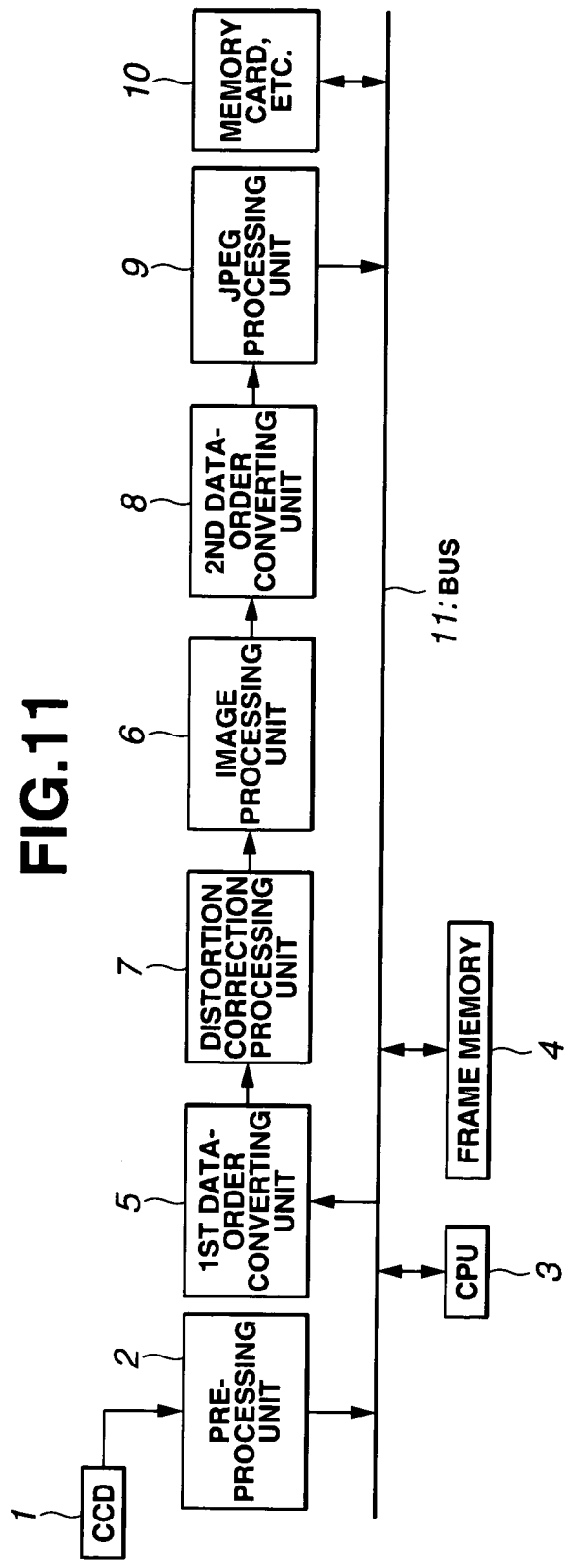
FIG. 11 is a block diagram showing the configuration of an image processing apparatus according to a first modification of the first embodiment.

FIG. 11 is a block diagram showing the configuration of an image processing apparatus according to a first modification.

Referring to FIG. 11, the captured image data outputted from the CCD 1 (e.g., Bayer data) is temporarily stored in the frame memory 4 and then the distortion in the image is corrected before forming the three-chip signal. As compared with the configuration shown in FIG. 1, the position of the image processing unit 6 and the position of the distortion correction processing unit 7 are exchanged. Referring to FIG. 1, the image data which is subjected to three-chip signal by the image processing unit 6 is processed every color. However, the present invention is not limited to this. Referring to FIG. 11, the Bayer data outputted from the CCD 1 having color filters of Bayer pattern may be subjected to the distortion correction processing. In this case, the interpolating processing is not performed by using a plurality of adjacent pixels (e.g., 16 pixels) and the interpolating processing is performed by using the adjacent pixel having the same color in the Bayer pattern. With the configuration, the amount of data for correcting the distortion is reduced, as compared with the image data after the three-chip signal plate.

Figure 12:
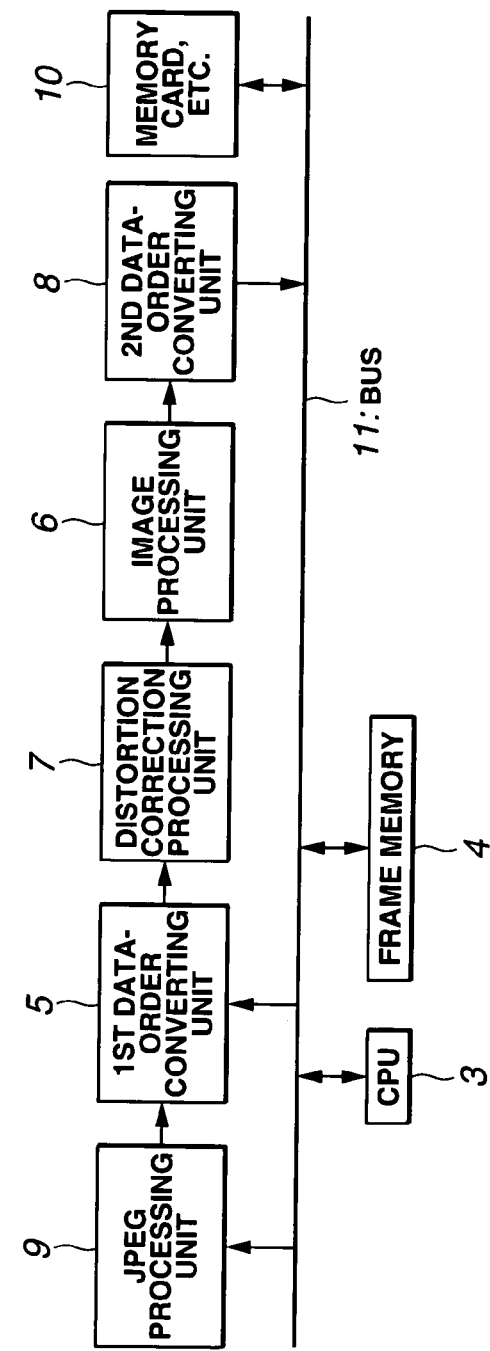
FIG. 12 is a block diagram showing the configuration of an image processing apparatus according to a second modification the first embodiment.

FIG. 12 is a block diagram showing the configuration of an image processing apparatus according to a second modification. FIG. 12 shows an example of the configuration for correcting the distortion of the image data recorded to the memory card 10. In the example of the configuration, the JPEG processing unit 9 is arranged at the previous block of the first data-order converting unit 5, and decompresses the image data compressed by the compression format, such as JPEG, read from the memory card 10. The distortion correction processing unit 7 processes the decompressed image data as mentioned above via the first data-order converting unit 5 or the image processing unit 6. Further, the second data-order converting unit 8 converts the data into data in the original data order. Incidentally, upon recording non-compressed data, such as TIFF data, to the memory card 10, the data can be subjected to the image processing including the distortion correction without the decompression processing.

Figure 13:
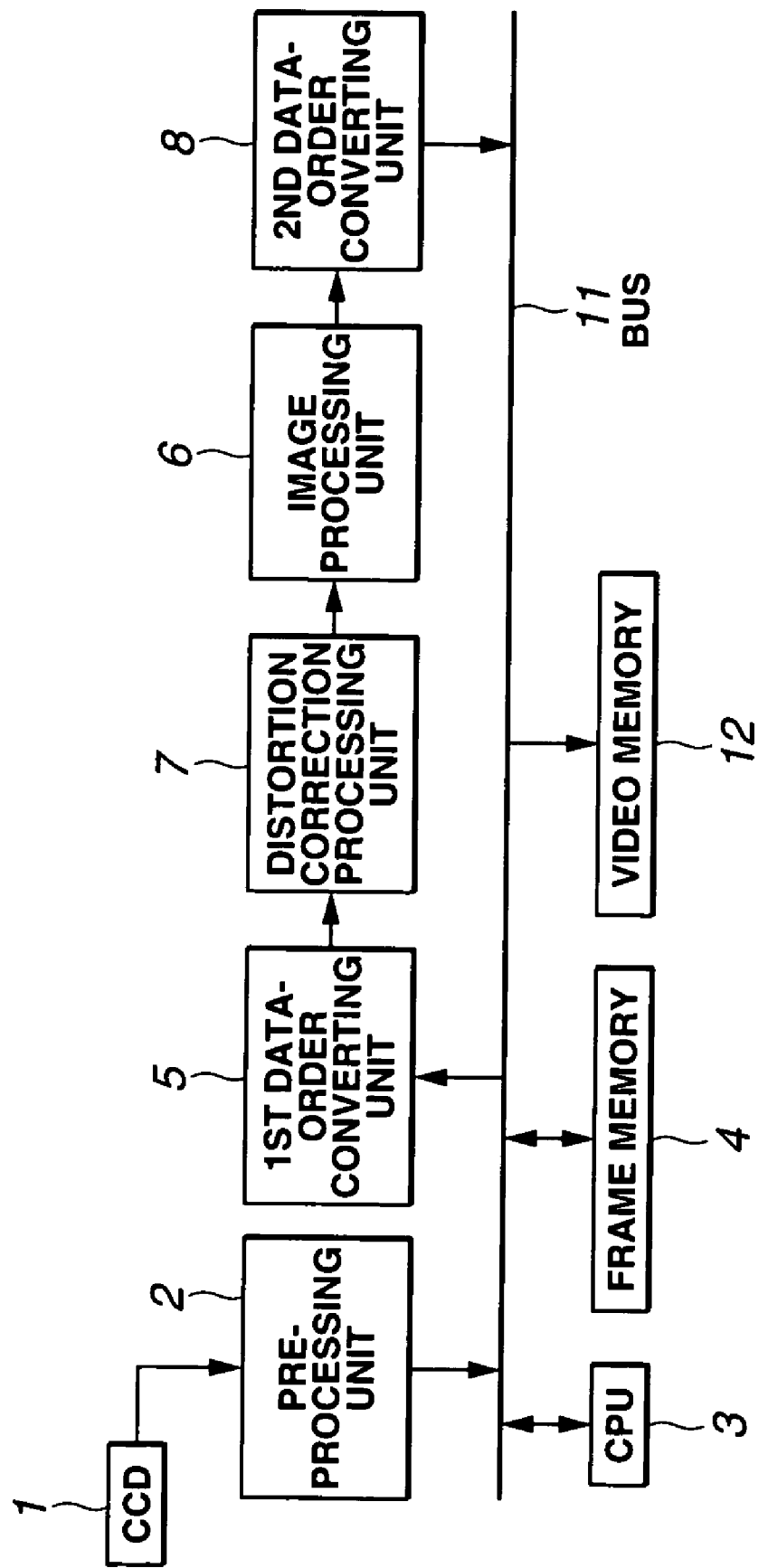
FIG. 13 is a block diagram showing the configuration of an image processing apparatus according to a third modification of the first embodiment.

FIG. 13 is a block diagram showing the configuration of an image processing apparatus according to a third modification. In the example shown in FIG. 13, the image data after procession of the distortion correction is outputted to be displayed as an image, without compression. The image data converted into the original data order by the second data-order converting unit 8 is written to a video memory 12 via the bus 11 without the compression using a compression format, such as JPEG, and is displayed as an image.

Figure 14:
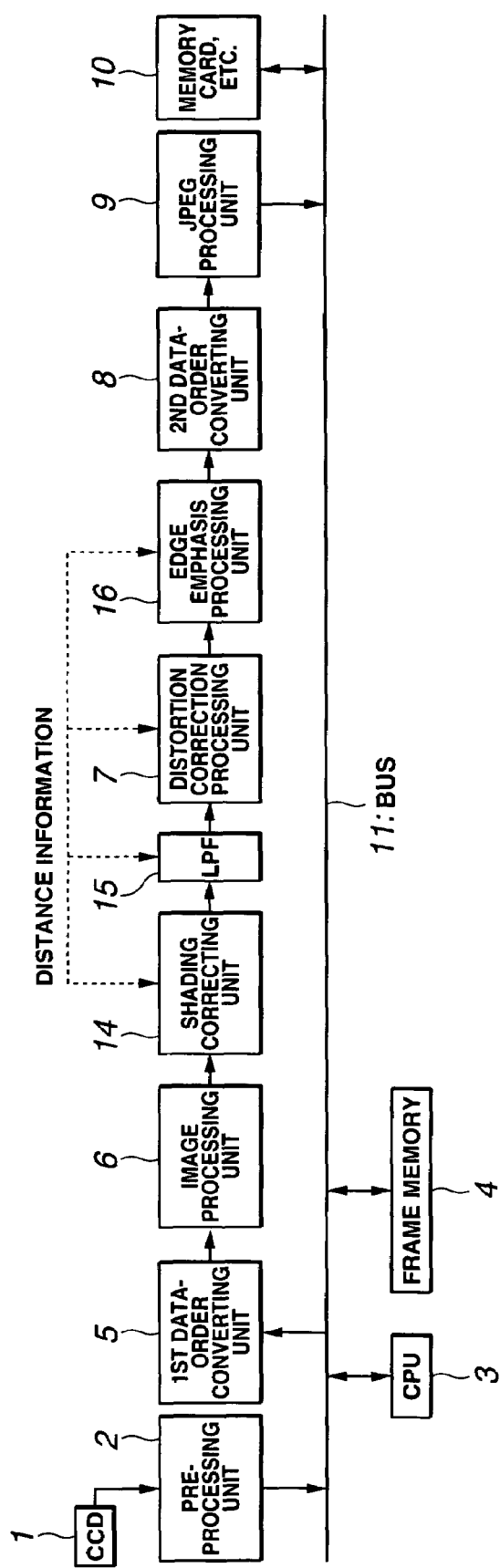
FIG. 14 is a block diagram showing the configuration of an image processing apparatus according to a fourth modification of the first embodiment.

FIG. 14 is a block diagram showing the configuration of an image processing apparatus according to a fourth modification. In the example shown in FIG. 14, distance information used for distortion correction processing (distance Z from the center of distortion to the interpolating position) is used for another image processing. In the example of configuration, the image processing apparatus comprises, at the subsequent stage of the image processing unit 6 on the channel of pipeline processing: a shading correcting unit 14, serving as an image processing unit, for correcting the shortage of marginal rays due to the optical system; a low-pass filter (LPF) processing unit 15, serving as an image processing unit, for cutting-off an unnecessary high-frequency component; the distortion correction processing unit 7; and an edge emphasis processing unit 16, serving as an image processing unit, for emphasizing the edge portion in the image in the order thereof. The distance information is outputted, from the distortion correction processing unit 7, to the shading correcting unit 14, the low-pass filter (LPF) processing unit 15, and the edge emphasis processing unit 16, and is used for the processing as occasion demands.

Thus, the shading correcting unit 14 properly corrects the shortage of marginal rays caused depending on the distance from the center of distortion. When the distortion aberration caused depending on the distance from the center of distortion is a barrel-type one, the marginal portion of image is extended upon correcting the distortion aberration and the sharpness of image deteriorates. The deterioration is properly corrected by the low-pass filter (LPF) processing unit 15 or the edge emphasis processing unit 16. Since the shading correcting unit 14, the low-pass filter (LPF) processing unit 15, and the edge emphasis processing unit 16 do not need to individually calculate the distance information, the circuit scale can be reduced.

Referring to FIG. 14, the distortion correction processing unit 7 outputs the distance information to the shading correcting unit 14 or the low-pass filter (LPF) processing unit 15 on the previous stage of the channel of pipeline processing. However, in consideration of the processing order, the processing block for calculating the distance Z may be independently arranged on the previous stage of the blocks using the distance information.

In the foregoing, the image processing apparatus as a digital camera is explained. However, the present invention is not limited to this and it may be a dedicated image processing apparatus or an image processing apparatus which is provided as an extension board of a computer or the like.

Further, the target of image processing in the digital camera or video camera is not limited to the image data which is obtained by photoelectrically converting the subject image formed by the optical system by image pickup means, such as a CCD, serving as an image pickup device, non-compressed image data obtained by processing the image data, or compressed image data obtained by compressing after processing the image data. For example, the target of distortion correction processing may be image data obtained by capturing by image pickup means, such as a scanner, an image of a print or a film taken by a silver-halide camera.

Further, the target of image processing is not limited to the image data which is configured by completely aligning the image data in the column direction and in the row direction. For example, even when the image data is that captured by the image pickup device having a honeycomb-type pixel arrangement, if it is image data for practical processing in the column correction and in the row direction, the above-described distortion correction processing can be performed.

According to the first embodiment, the image data is transferred, so as to be subjected to the pipeline processing, to the image processing unit or the distortion correction processing unit via an information sending channel different from the bus. Further, since the data is transferred in units of a block and the reading direction is improved, the image processing including the distortion correction can be performed without increasing the amount of data transfer of the bus and the memory capacity.

The coordinates of the target point before procession of the distortion correction corresponding to the coordinates of the target points after procession of the distortion correction are calculated in consideration of the term of fourth degree or the term of sixth degree of the distance from the center of distortion to the interpolating position, or the term of the higher degree thereof. Thus, the distortion aberration of the term of the higher degree, such as a curvilinear distortion aberration or the like can be precisely corrected.

Further, the selector selects the coordinates generated by the interpolating-position generating unit and the coordinates converted by the distortion-correction-coordinate converting unit, thereby desirably selecting whether or not the distortion is to be corrected as occasion demands. Thus, the image data is temporarily stored in a memory card without the distortion correction processing in the image pickup operation. After that, the image data is read from the memory card and then the distortion can be corrected. The above-described selection omits the distortion correction processing in the image pickup operation and thus the fast processing is possible.

Further, the distance information calculated by the distortion correction processing unit is outputted to the shading correcting unit, the low-pass filter (LPF) processing unit, and the edge emphasis processing unit. Thus, it is possible to properly correct the shortage of marginal rays and to properly correct the unsharpness of image without increasing the circuit scale.

In accordance with the size of distortion aberration varied depending on the distance from the center of distortion, at least one of the sizes of the image data read from the memory in units of a block in the row direction and in the column direction is properly changed. Thus, the data which is necessary and sufficient for processing can be read. Therefore, the processing is fast.

Figure 15:
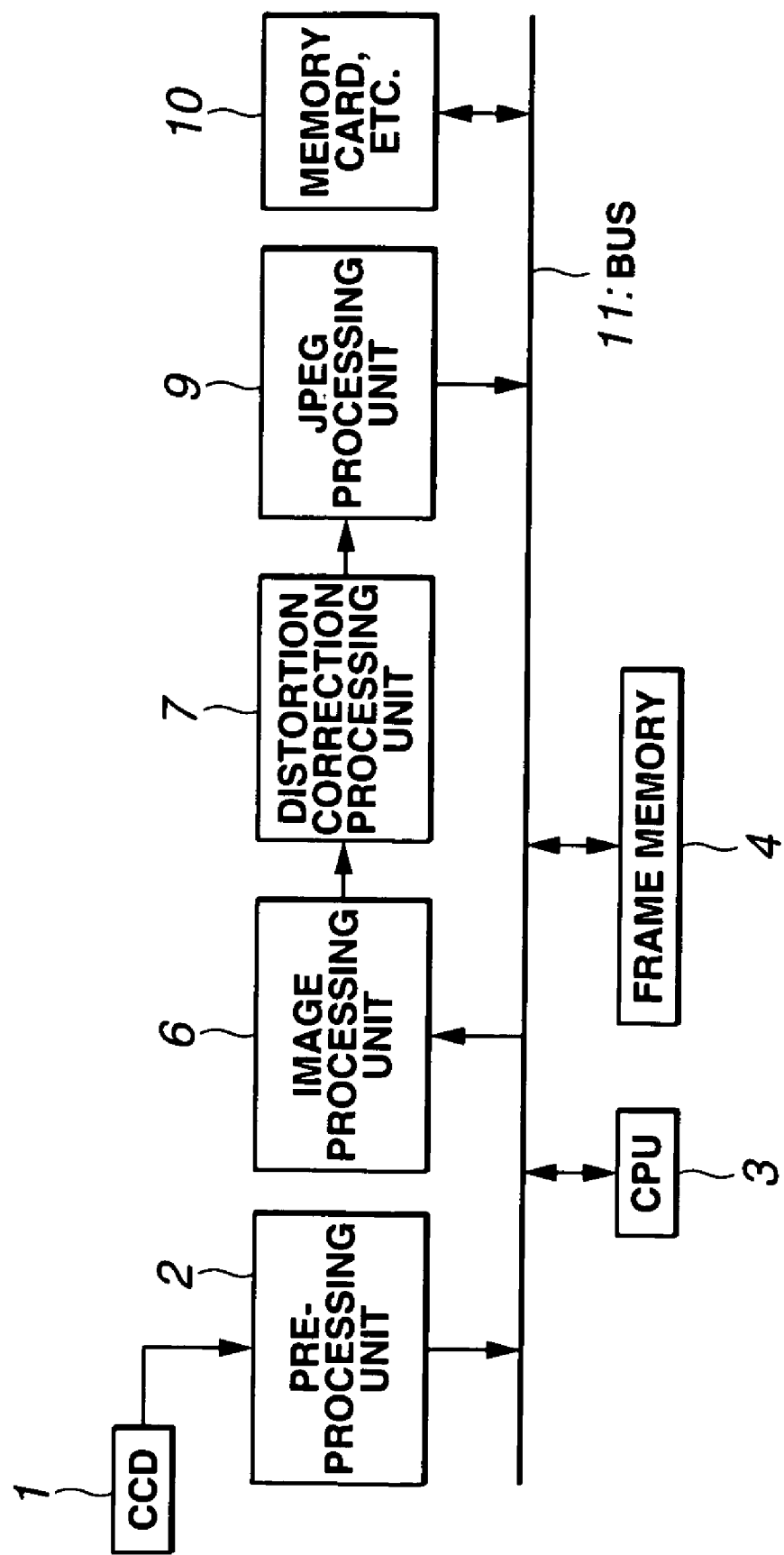
FIG. 15 is a block diagram showing the configuration of an image processing apparatus according to the second embodiment of the present invention.

FIGS. 15 to 20 show a second embodiment of the present invention, and FIG. 15 is a block diagram showing the configuration of an image processing apparatus.

According to the second embodiment, the same portions as those according to the first embodiment are not described and different portions are mainly described.

The image processing apparatus according to the second embodiment comprises components excluding the first data-order converting unit 5 and the second data-order converting unit 8 from the image processing apparatus shown in FIG. 1 according to the first embodiment.

Further, the distortion correction processing unit 7, serving as an image processing unit and distortion correction processing means, according to the second embodiment performs the enlarging and reducing processing as well as the distortion correction processing of the image data after the procession by the image processing unit 6.

Similarly to the foregoing, the image processing unit 6, the distortion correction processing unit 7, and the JPEG processing unit 9 are connected, via an information sending channel different from the bus 11, for the pipeline processing. In this case, an inner buffer of the image processing unit, which reduces the capacity by performing the processing in units of a block, is the inner memory unit 25 shown in FIG. 2 or a 2-port SRAM 25a shown in FIG. 16.

The configuration of the distortion correction processing unit 7 is similar to that described with reference to FIG. 2.

In the configuration example shown in FIG. 15, the previous-stage processing block of the distortion correction processing unit 7 corresponds to the image processing unit 6, and the subsequent-stage processing block corresponds to the JPEG processing unit 9.

Here, a description is given of a basic formula for calculating the coordinates and a practical formula for reducing the circuit scale by modifying the basic formula in the interpolating-position generating unit 21 and the distortion-correcting-coordinate converting unit 22.

First, the basic formula will be described.

Basically, the interpolating-position generating unit 21 calculates the coordinates (X, Y) of the target point for interpolation by using the interpolating start position (XST, YST) and the interpolating step (ΔX, ΔY), set from the CPU 3 to the control register 7a, as shown by the Formula 1.

Basically, the distortion-correcting-coordinate converting unit 22 calculates, as follows, the coordinates (X', Y') of the target point before procession of the distortion correction from the coordinates (X, Y) after procession of the distortion correction outputted from the interpolating-position generating unit 21.

That is, the distortion-correcting-coordinate converting unit 22 first obtains the intermediate calculated values (X (dot), Y (dot)) (here, the point on the character is referred to as "dot" in the document), as shown by the above-described Formula 2.

Subsequently, the distortion-correcting-coordinate converting unit 22 calculates the distance Z from the center of distortion (specifically, the square of Z), as shown by the above-described Formula 3.

The distortion-correcting-coordinate converting unit 22 calculates, as shown by the following Formula 6, the coordinates (X', Y') of the target point before procession of the distortion correction corresponding to the coordinates (X, Y) of the target point after procession of the distortion correction, by using distortion correcting coefficients A, B, and C, serving as the parameters indicating the optical property on the distortion aberration of the optical system set to the control register 7a from the CPU 3, the calculated values (X (dot), Y (dot)), and the coordinates ($X_d$, $Y_d$) of the center of distortion.

$$\begin{cases} X' = (\dot{X} - X_d) \cdot [1 + A \cdot Z^2 + B \cdot Z^4 + C \cdot Z^6] + X_d \\ Y' = (\dot{Y} - Y_d) \cdot [1 + A \cdot Z^2 + B \cdot Z^4 + C \cdot Z^6] + Y_d \end{cases} \quad \text{[Formula 6]}$$

According to the second embodiment, as shown by Formula 6, the degree up to that over the term of second degree of Z, that is, the term of fourth degree or the term of sixth degree is considered. Thus, it is possible to precisely correct the aberration with the high degree, such as a curvilinear distortion aberration shown in FIG. 3D. Although up to the term of sixth degree is considered, the term of higher degree, such as the term of eighth degree or the term of tenth degree, may be considered as shown in the above-described Formula 4.

The above-described coordinates (X, Y) calculated by the interpolating position generating unit 21 or coordinates (X', Y') calculated by the distortion-correcting-coordinate converting unit 22 are inputted to the selector 23. The selector 23 selects the necessary coordinates depending on as whether or not the distortion is corrected.

Next, a description is given of the practical formula for reducing the circuit scale.

First, the Formula 2 and Formula 1 are substituted for the Formula 3, thereby obtaining a modified formula as shown by the following Formula 7.

$$Z^2 = \begin{aligned} & M^2 \cdot \left( \left[ S_X \cdot \left\{ (X - X_d) + \frac{X_{off}}{M} \right\} \right]^2 + \\ & \left[ S_Y \cdot \left\{ (Y - Y_d) + \frac{Y_{off}}{M} \right\} \right]^2 \right) \\ = & M^2 \cdot \left( \left[ S_X \cdot \left\{ (X_{ST} + k\Delta X - X_d) + \frac{X_{off}}{M} \right\} \right]^2 + \\ & \left[ S_Y \cdot \left\{ (Y_{ST} + l\Delta Y - Y_d) + \frac{Y_{off}}{M} \right\} \right]^2 \right) \end{aligned} \quad \text{[Formula 7]}$$

Then, a new constant expression as shown by the following Formula 8 is introduced, thereby modifying the Formula 7 to the following Formula 9.

$$\begin{cases} \ddot{X}_{ST} = S_X \cdot \left\{ (X_{ST} - X_d) + \dfrac{X_{off}}{M} \right\} \\ \ddot{Y}_{ST} = S_Y \cdot \left\{ (Y_{ST} - Y_d) + \dfrac{Y_{off}}{M} \right\} \\ \Delta\ddot{X} = S_X \times \Delta X \\ \Delta\ddot{Y} = S_Y \times \Delta Y \end{cases} \quad \text{[Formula 8]}$$

$$Z^2 = M^2 \ddot{Z}^2 = M^2 \cdot \left\{ (\ddot{X}_{ST} + k\Delta\ddot{X})^2 + (\ddot{Y}_{ST} + l\Delta\ddot{Y})^2 \right\} \quad \text{[Formula 9]}$$

The distance Z (2 dots) in the Formula 9 is defined as shown by the following Formula 10, and interpolating coordinate data X2 and Y2 are defined as shown by the following Formula 11.

$$\ddot{Z} = \dfrac{Z}{M} \quad \text{[Formula 10]}$$

$$\begin{cases} X2 = \ddot{X}_{ST} + k\Delta\ddot{X} \\ Y2 = \ddot{Y}_{ST} + l\Delta\ddot{Y} \end{cases} \quad \text{[Formula 11]}$$

The Formula 6 is modified as the following Formula 12 by using Z (2 dots) defined as shown in Formula 10 and Formula 11.

$$\begin{cases} X' = \left[ 1 + (AM^2)\ddot{Z}^2 + (BM^4)\ddot{Z}^4 + (CM^6)\ddot{Z}^6 \right] \cdot (\dot{X} - X_d) + X_d \\ \quad = \left[ 1 + \dot{A}\ddot{Z}^2 + \dot{B}\ddot{Z}^4 + \dot{C}\ddot{Z}^6 \right] \cdot (\dot{X} - X_d) + X_d \\ \quad = \left[ 1 + \dot{A}\ddot{Z}^2 + \dot{B}\ddot{Z}^4 + \dot{C}\ddot{Z}^6 \right] \cdot \{ M(X_{ST} - X_d) + X_{off} + M \cdot k\Delta X \} + X_d \\ \quad = \left[ 1 + \dot{A}\ddot{Z}^2 + \dot{B}\ddot{Z}^4 + \dot{C}\ddot{Z}^6 \right] \cdot (\ddot{X} + k\Delta\ddot{X}) + X_d \\ \quad = F \cdot X1 + X_d \\ Y' = \left[ 1 + (AM^2)\ddot{Z}^2 + (BM^4)\ddot{Z}^4 + (CM^6)\ddot{Z}^6 \right] \cdot (\dot{Y} - Y_d) + Y_d \\ \quad = \left[ 1 + \dot{A}\ddot{Z}^2 + \dot{B}\ddot{Z}^4 + \dot{C}\ddot{Z}^6 \right] \cdot (\dot{Y} - Y_d) + Y_d \\ \quad = \left[ 1 + \dot{A}\ddot{Z}^2 + \dot{B}\ddot{Z}^4 + \dot{C}\ddot{Z}^6 \right] \cdot \{ M(Y_{ST} - Y_d) + Y_{off} + M \cdot l\Delta Y \} + Y_d \\ \quad = \left[ 1 + \dot{A}\ddot{Z}^2 + \dot{B}\ddot{Z}^4 + \dot{C}\ddot{Z}^6 \right] \cdot (\ddot{Y} + l\Delta\ddot{Y}) + Y_d \\ \quad = F \cdot Y1 + Y_d \end{cases} \quad \text{[Formula 12]}$$

Here, the Formula 12 uses constant expressions or variable expressions defined as shown in the following Formula 13 to Formula 16.

$$\begin{cases} \dot{A} = AM^2 \\ \dot{B} = BM^4 \\ \dot{C} = CM^6 \end{cases} \quad \text{[Formula 13]}$$

$$\begin{cases} \ddot{X} = M(X_{ST} - X_d) + X_{off} \\ \Delta\ddot{X} = M \cdot \Delta X \\ \ddot{Y} = M(Y_{ST} - Y_d) + Y_{off} \\ \Delta\ddot{Y} = M \cdot \Delta Y \end{cases} \quad \text{[Formula 14]}$$

$$\begin{cases} X1 = \ddot{X} + k\Delta\ddot{X} \\ Y1 = \ddot{Y} + l\Delta\ddot{Y} \end{cases} \quad \text{[Formula 15]}$$

$$F = \left[ 1 + \dot{A}\ddot{Z}^2 + \dot{B}\ddot{Z}^4 + \dot{C}\ddot{Z}^6 \right] \quad \text{[Formula 16]}$$

In the calculation using the basic formulae shown in the Formula 1 to Formula 3 and Formula 6, the number of coefficients is 14 and the number of multiplying times is 13. That is, the total number of coefficients is 14, including the center $(X_d, Y_d)$ of the distortion, the amount $(X_{off}, Y_{off})$ of correction for the shift from the center, the magnification M for correcting the range, the coefficients $(S_x, S_y)$, the coefficients A, B, and C for correcting the distortion, the interpolating start position $(X_{ST}, Y_{ST})$, and the interpolating step $(\Delta X, \Delta Y)$. The total number of multiplying times is 13, including two multiplying times to M in the Formula 2, four multiplying times including the multiplications to Sx and Sy in the Formula 3 and two formulae of the square, three multiplying times to the coefficients A, B, and C for correcting the distortion in the Formula 6, two multiplying times for calculating the fourth power and the sixth power of Z, and two multiplying times of a large bracket and a small bracket.

On the contrary, in the calculation using the practical formulae shown in the Formula 7 to Formula 16, the number of coefficients is 13 and the number of multiplying times is 9. That is, the total number of coefficients is 13, including X (2 dots) $S_T$, Y (2 dots) $S_T$, $\Delta X$ (2 dots), $\Delta Y$ (2 dots), X (3 dots), Y (3 dots), $\Delta X$ (3 dots), $\Delta Y$ (3 dots), A (dot), B (dot), C (dot), $X_d$, and $Y_d$. The total number of multiplying times is 9, including two multiplying times of two formulae of the square in the middle bracket in the Formula 9, three multiplying times to A (dot), B (dot), and C (dot) in the Formula 16, two multiplying times for calculating the fourth power and the sixth power of Z (dots) in the Formula 16, and two multiplying times to F in the Formula 12.

For the numbers used in such calculations as above, even if the dynamic range is wide and the number of calculating times slightly increases, the circuit scale increases. Therefore, the calculation is executed by using the above-described practical formulae, thereby reducing the number of multipliers, reducing the number of registers for setting the coefficients, and efficiently reducing the circuit scale.

Based on the above-modified practical formulae, an interpolating-position calculating circuit 21a (refer to FIG. 16, which will be described later) corresponding to the interpolating position generating unit 21 calculates coordinates (interpolating position) (X1, Y1) of the target point for interpolation, as shown in the Formula 15, by using the interpolating start position (X (3 dots), Y (3 dots)) set to the control register 7a from the CPU 3 and the interpolating step (ΔX (3 dots), ΔY (3 dots)).

A distortion-correcting-coordinate converting unit 22a (refer to FIGS. 16 and 17, which will be described later), serving as distortion-correcting-coefficient calculating means of the distortion-correcting-coordinate converting unit 22, calculates the distortion correcting coefficient F, as shown in the Formula 16, by using A (dot), B (dot), and C (dot) set to the control register 7a from the CPU 3. As will be described later, in place of the configuration shown in FIG. 17, the distortion correcting coefficient F can be calculated with the configuration shown in FIG. 18.

Further, an interpolating-position correcting circuit 22b (refer to FIG. 16, which will be described later) of the distortion-correcting-coordinate converting unit 22 calculates the coordinates (interpolating coordinate data) (X', Y') of the target point before procession of the distortion correction by the Formula 12 from the coordinates (interpolating position) (X1, Y1) of the target point by using the calculated distortion correcting coefficient F and the coordinates ($X_d$, $Y_d$) of the center of distortion set to the control register 7a from the CPU 3.

Subsequently, the interpolation calculating unit 26 reads, from the inner memory unit 25, image data $D_0$ to $D_{15}$ of the pixels near the coordinates based on the coordinates outputted from the selector 23, calculates image data $D_{out}$ after procession of distortion correction on the target point by using the Formula 5, and outputs the calculated data to the subsequent-stage processing block.

Figure 16:
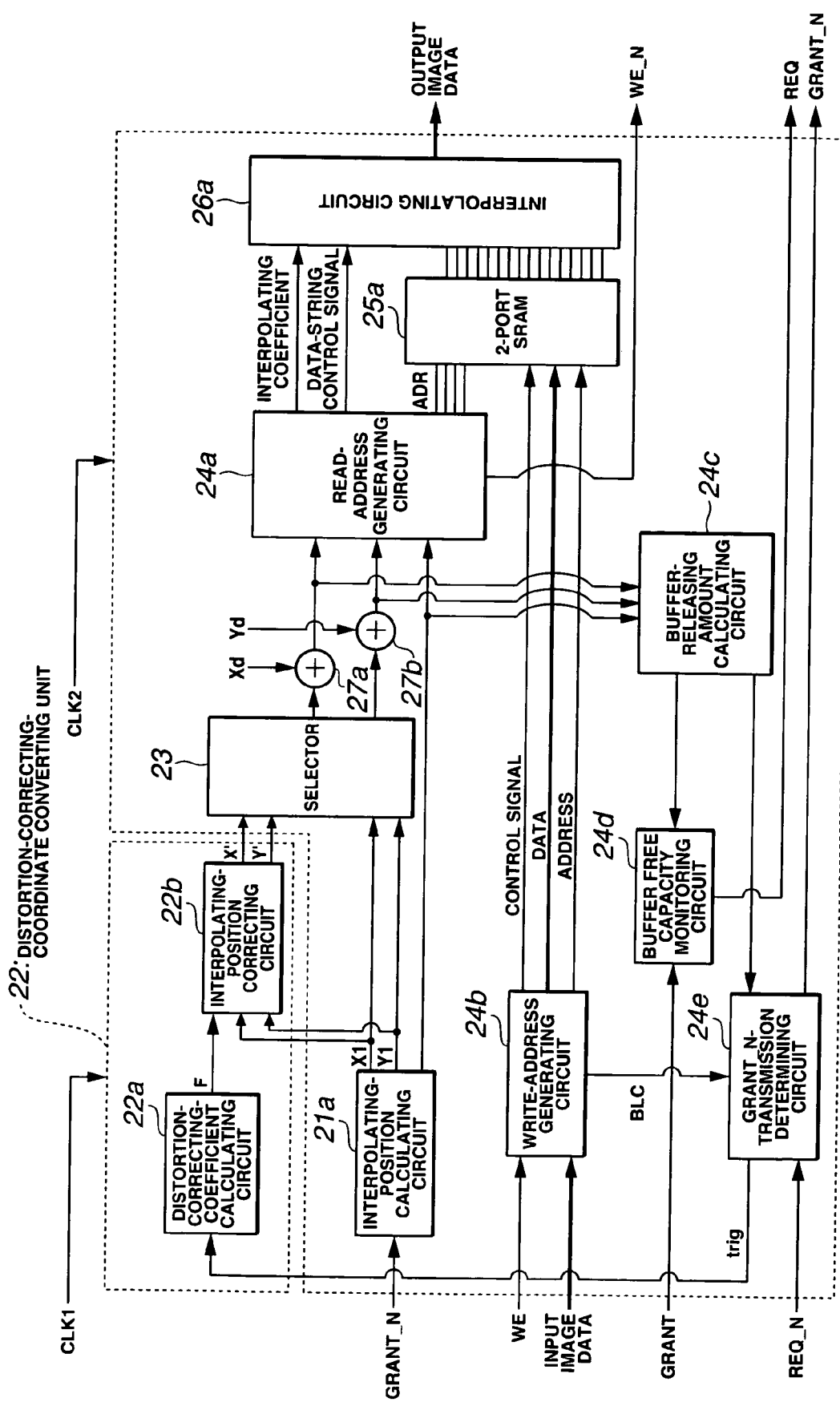
FIG. 16 is a block diagram showing the details of a distortion correction processing unit according to the second embodiment.

FIG. 16 is a block diagram showing the detailed configuration of the distortion correction processing unit 7.

The interpolating-position generating unit 21 comprises the interpolating-position calculating circuit 21a that calculates the coordinates (X1, Y1) of the target point as mentioned above.

The distortion-correcting-coordinate converting unit 22 comprises: the distortion-correcting-coefficient calculating circuit 22a that calculates the distortion correcting coefficient F as shown in the Formula 16; and the interpolating-position correcting circuit 22b that calculates the coordinates (X1, Y1) of the target point before procession of the distortion correction as shown in the Formula 12 by using the distortion correcting coefficient F calculated by the distortion-correcting-coefficient calculating circuit 22a.

In the case that the distortion correction processing is not performed, the selector 23 selects the coordinates (X1, Y1) from the interpolating-position calculating circuit 21a (irrespective of whether or not the enlarging and reducing processing is performed). In the case that the distortion correction processing is performed, the selector 23 selects the coordinates (X', Y') from the interpolating-position correcting circuit 22b (irrespective of whether or not the enlarging and reducing processing is performed).

Adders 27a and 27b add the coordinates ($X_d$, $Y_d$) of the center of distortion set by the CPU 3 via the control register 7a to the coordinates (X1, Y1) or (X', Y') selected by the selector 23.

The outputs from the adders 27a and 27b are outputted to a read-address generating circuit 24a and a buffer-releasing amount calculating circuit 24c.

Further, the coordinates (X1, Y1) calculated by the interpolating-position calculating circuit 21a are inputted to the read-address generating circuit 24a, independently of a channel via the selector 23. The read-address generating circuit 24a outputs, to the 2-port SRAM 25a, an address ADR for storing the pixel data related to the coordinates (X1, X1) (16 pieces of pixel data around the coordinates (X1, Y1) the center in the case of the 16-point interpolation). Further, the read-address generating circuit 24a outputs, to an interpolating circuit 26a, the interpolating coefficient (e.g., interpolating coefficients $k_{x0}$ to $k_{x3}$ and $k_{y0}$ to $k_{y3}$ as shown in the Formula 5) and a data string control signal indicating which of pixel data $D_0$ to $D_{15}$ is output pixel data. Further, the read-address generating circuit 24a outputs a write enable signal WE_N to the subsequent-stage processing block.

The 2-port SRAM 25a is a circuit corresponding to the inner memory unit 25 shown in FIG. 2.

The interpolating circuit 26a corresponds to the interpolation calculating unit 26 shown in FIG. 2, and performs the interpolating procession as shown in the Formula 5 by using the image data read from the 2-port SRAM 25a and outputs the image data after the procession to the subsequent-stage processing block.

The buffer-releasing amount calculating circuit 24c calculates the storage capacity (releasing amount of buffer) releasable in the 2-port SRAM 25a based on the output from the interpolating-position calculating circuit 21a and the output from the selector 23.

A buffer free-capacity monitoring circuit 24d monitors a free capacity of the 2-port SRAM 25a by referring to the output of the buffer-releasing amount calculating circuit 24c.

The write-address generating circuit 24b receives the image data from the previous-stage processing block and records the image data to the 2-port SRAM 25a.

A GRANT_N transmission determining circuit 24e receives a request signal REQ_N for requesting the image data from the subsequent-stage processing block, determines, based on the outputs of the write-address generating circuit 24b and the buffer-releasing amount calculating circuit 24c, whether or not the image data can be sent. When it is determined that the image data can be set, the GRANT_N transmission determining circuit 24e outputs a grant signal GRANT_N to the subsequent-stage processing block and the interpolating-position calculating circuit 21a. Further, the GRANT_N transmission determining circuit 24e outputs a trigger trig to the distortion-correcting-coefficient calculating circuit 22a so that the distortion-correcting-coefficient calculating circuit 22a outputs the distortion correcting coefficient F at the timing when the interpolating-position calculating circuit 21a, which receives the grant signal GRANT_N, calculates and outputs the coordinates (X1, Y1).

In the configuration of the distortion correction processing unit 7 shown in FIG. 16, the circuits except for the distortion-correcting-coordinate converting unit 22 receive a clock CLK2. The distortion-correcting-coordinate converting unit 22 receives a clock CLK1 different from the clock CLK2.

Thus, in the case that the distortion correction processing is not performed, that is, only with the enlarging and reducing processing or in the case that both the distortion correction processing and the enlarging and reducing processing are not performed, stopping the clock CLK1 supplied to the distortion-correcting-coordinate converting unit 22 suppresses unnecessary power consumption. Further, by controlling the reduction or return to rating with respect to the number of clocks CLK1 supplied, the number of times for generating the interpolating coordinate data per unit time can be controlled and be adjusted.

Next, a description is given of the operation of the distortion correction processing unit 7 as shown in FIG. 16.

The buffer free-capacity monitoring circuit 24d monitors the free capacity of the 2-port SRAM 25a via the buffer-releasing amount calculating circuit 24c. When the 2-port SRAM 25a has a predetermined free capacity, the buffer free-capacity monitoring circuit 24d issues a request signal REQ to the previous-stage processing block so as to send image data in units of a predetermined block (hereinafter, properly referred to as unit line (UL) data) (in step S1).

The previous-stage processing block receives the request signal REQ, and sends the grant signal GRANT when the image data can be sent. The buffer free-capacity monitoring circuit 24d receives the grant signal GRANT (in step S2).

The buffer free-capacity monitoring circuit 24d monitors the free capacity of the 2-port SRAM 25a by using a counter held therein, and receives the grant signal GRANT and simultaneously decrements a value of the inner counter. The buffer free-capacity monitoring circuit 24d operates so as to delete the request signal REQ when the inner counter counts 0 (in step S3).

Then, the previous-stage processing block inputs a write enable signal WE to the write-address generating circuit 24b, and subsequently inputs the image data. In accordance therewith, the write-address generating circuit 24b outputs a control signal to the 2-port SRAM 25a, and write image data DATA to an area designated by an address ADDRESS of the 2-port SRAM 25a. Further, the write-address generating circuit 24b increases, every input of UL data, a BLC counter (counter indicating how data is stored in the 2-port SRAM 25a serving as an inner buffer), and outputs the counter value to the GRANT_N transmission determining circuit 24e (in step S4).

The GRANT_N transmission determining circuit 24e receives the request signal REQ_N from the subsequent-stage processing block and then determines whether or not the 2-port SRAM 25a includes the UL data to be next sent. When it is determined that the 2-port SRAM 25a includes the UL data, the GRANT_N transmission determining circuit 24e sends the grant signal GRANT_N to the subsequent-stage processing block and the interpolating-position calculating circuit 21a (in step S5).

The interpolating-position calculating circuit 21a receives the grant signal GRANT_N and then starts the operation. The interpolating-position calculating circuit 21a calculates the coordinates (X1, Y1) of the interpolating position corresponding to one piece of UL data, then, calculates the coordinates of the head of the next UL data, and ends the operation (in step S6).

The interpolating-position calculating circuit 21a starts the operation and outputs the coordinates (X1, Y1). Synchronously therewith, the GRANT_N transmission determining circuit 24e outputs the trigger trig to the distortion-correcting-coefficient calculating circuit 22a at the timing for outputting the distortion correcting coefficient F by the distortion-correcting-coefficient calculating circuit 22a (in step S7).

The distortion-correcting-coefficient calculating circuit 22a receives the trigger trig, then, calculates the distortion correcting coefficient F of the pixel in the UL data based on the Formula 16, and outputs the calculated coefficient to the interpolating-position correcting circuit 22b. Similarly to the interpolating-position calculating circuit 21a, the distortion-correcting-coefficient calculating circuit 22a performs calculation of the distortion correcting coefficient F corresponding to one piece of UL data, then, calculates the coordinates of the head of the next UL data, and end the operation (in step S8).

The interpolating-position correcting circuit 22b calculates the coordinates (X', Y') based on Formula 12 by using the distortion correcting coefficient F received from the distortion-correcting-coefficient calculating circuit 22a and the coordinates (X1, Y1) received from the interpolating-position calculating circuit 21a. The interpolating-position correcting circuit 22b performs calculation of the distortion correcting coefficient F corresponding to one piece of UL data in accordance with the distortion-correcting-coefficient calculating circuit 22a, then, calculates the coordinates of the head of the next UL data, and ends the operation (in step S9).

In accordance with the operating mode set by the CPU 3 via the control register 7a, the selector 23 selects the coordinates (X', Y') from the interpolating-position correcting circuit 22b in the case that the distortion correction processing is performed, and selects the coordinates (X1, Y1) from the interpolating-position calculating circuit 21a in the case that the distortion correction processing is not performed (in step S10).

The adders 27a and 27b add the coordinates $(X_d, Y_d)$ of the center of distortion to the coordinates (X1, Y1) or (X', Y') selected by the selector 23 (in step S11).

The read-address generating circuit 24a outputs, to the 2-port SRAM 25a, the address ADR of the pixel data read from the 2-port SRAM 25a for the use of interpolation based on the coordinates received from the adders 27a and 27b, and further outputs the interpolating coefficient and the data string control signal to the interpolating circuit 26a (in step S12).

The interpolating circuit 26a calculates the interpolated pixel data as shown in the Formula 5 by using the interpolating coefficient and the data string control signal received from the read-address generating circuit 24a and the pixel data received from the 2-port SRAM 25a, and outputs the calculated data to the subsequent-stage processing block (in step S13).

When it is determined that the UL data is outputted up to the end, the buffer-releasing amount calculating circuit 24c calculates the difference between the coordinates of the head of the UL data subjected to the processing performed immediately before and the coordinates of the head of the next UL data based on the outputs of the interpolating-position calculating circuit 21a and the adders 27a and 27b. In order to release the buffer (area in the 2-port SRAM 25a) which stores unnecessary data, the buffer-releasing amount calculating circuit 24c outputs the released amount of buffer to the buffer free-capacity monitoring circuit 24d, and sends, to the GRANT_N transmission determining circuit 24e, which amount of data is received from the previous-stage processing block for the procession of the next UL data (in step S14).

When it is determined in step S14 that the 2-port SRAM 25a, serving as the inner buffer, includes the free storage area, the buffer free-capacity monitoring circuit 24d returns to step S1 and the above-described processing repeats (in step S15).

The GRANT_N transmission determining circuit 24e determines, based on a BLC counter value from the write-address generating circuit 24b and the output from the buffer-releasing amount calculating circuit 24c, whether or not the next UL data can be sent to the subsequent-stage processing block. When it is determined that the next UL data can be sent, the processing in step S5 is performed (in step S16).

Figure 17:
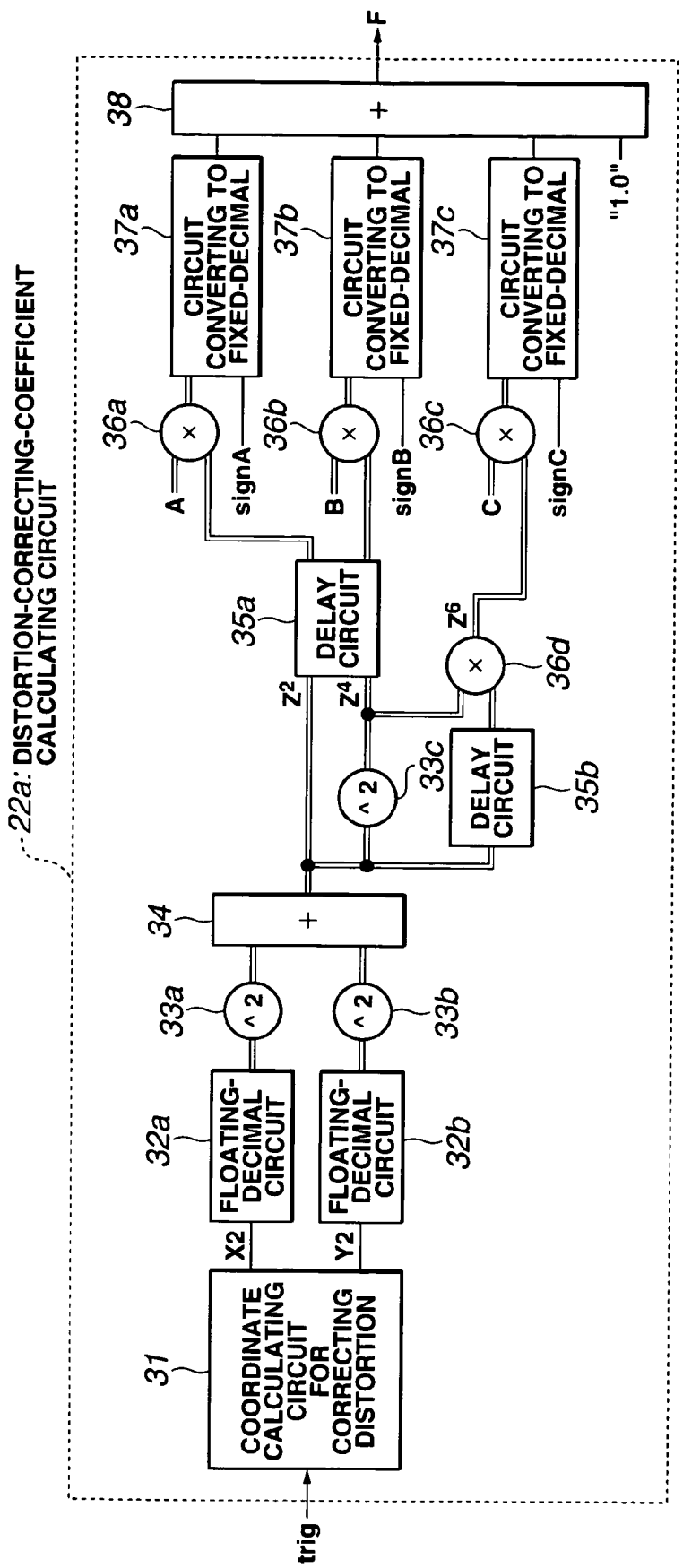
FIG. 17 is a block diagram showing one example of the configuration of a distortion-correcting-coefficient calculating circuit according to the second embodiment.

FIG. 17 is a block diagram showing one example of the configuration of the distortion-correcting-coefficient calculating circuit 22a. The distortion-correcting-coefficient calculating circuit 22a calculates the distortion correcting coefficient F based on the Formula 16.

Referring to FIG. 17, in the following description with reference to FIG. 17, reference symbol Z denotes Z (2 dots) indicated in the left side in the Formula 10, and the coefficients A, B, and C denote A (dot), B (dot), and C (dot) indicated in the left side in the Formula 13.

The distortion-correcting-coefficient calculating circuit 22a comprises: a coordinates-used-for-distortion-correction calculating circuit 31 that calculates interpolating coordinates X2 and Y2 based on the Formula 11 when the GRANT_N transmission determining circuit 24e inputs the trigger trig; a floating-decimal circuit 32a that converts, into a floating decimal, the interpolating coordinate X2 calculated by the coordinates-used-for-distortion-correction calculating circuit 31; a floating-decimal circuit 32b that converts, into a floating decimal, the interpolating coordinate Y2 calculated by the coordinates-used-for-distortion-correction calculating circuit 31; a squaring calculator 33a that squares the interpolating coordinate X2 converted into floating decimal by the floating-decimal circuit 32a; a squaring calculator 33b that squares the interpolating coordinate Y2 converted into floating decimal by the floating-decimal circuit 32b; an adder 34 that calculates the square of Z (specifically, Z (2 dots) as mentioned above, hereinafter, similar) by adding the square of the interpolating coordinate X2 calculated by the squaring calculator 33a and the square of the interpolating coordinate Y2 calculated by the squaring calculator 33b; a squaring calculator 33c that calculates the fourth power of Z by squaring the output from the adder 34; a delay circuit 35b that delays the output from the adder 34; a multiplier 36d that calculates the sixth power of Z by multiplying the fourth power of Z calculated by the squaring calculator 33c and the square of Z outputted at the delay timing of the delay circuit 35b; a delay circuit 35a that delays the output from the adder 34 and further delays the output from the squaring calculator 33c; a multiplier 36a that multiplies the coefficient A (specifically, A (dot) as mentioned above, hereinafter, similar) set to the control register 7a from the CPU 3 to the square of Z outputted at the delay timing of the delay circuit 35a; a multiplier 36b that multiplies the coefficient B (specifically, B (dot) as mentioned above, hereinafter, similar) set to the control register 7a from the CPU 3 to the fourth power of Z outputted at the delay timing of the delay circuit 35a; a multiplier 36c that multiplies the coefficient C (specifically, C (dot) as mentioned above, hereinafter, similar) set to the control register 7a from the CPU 3 to the sixth power of Z outputted from the multiplier 36d; a circuit converting to fixed-decimal 37a that sends, to the output from the multiplier 36a, a sign signA of the coefficient A set to the control register 7a from the CPU 3 and converts the data to a fixed decimal; a circuit converting to fixed-decimal 37b that sends, to the output from the multiplier 36b, a sign signB of the coefficient B set to the control register 7a from the CPU 3 and converts the data to a fixed decimal; a circuit converting to fixed-decimal 37c that sends, to the output from the multiplier 36c, a sign signC of the coefficient C set to the control register 7a from the CPU 3 and converts the data to a fixed decimal; and an adder 38 that adds the output from the circuit converting to fixed-decimal 37a, the output from the circuit converting to fixed-decimal 37b, the output from the circuit converting to fixed-decimal 37c, and a constant 1.0 set to the control register 7a from the CPU 3, thereby calculating the distortion correcting coefficient F based on Formula 16.

Referring to FIG. 17, a portion shown by a double line is subjected to the calculation processing using a floating decimal. The numerals X2, Y2 and Z having the wide dynamic range are treated as floating decimal, thereby reducing the circuit scale while ensuring the precision.

Figure 18:
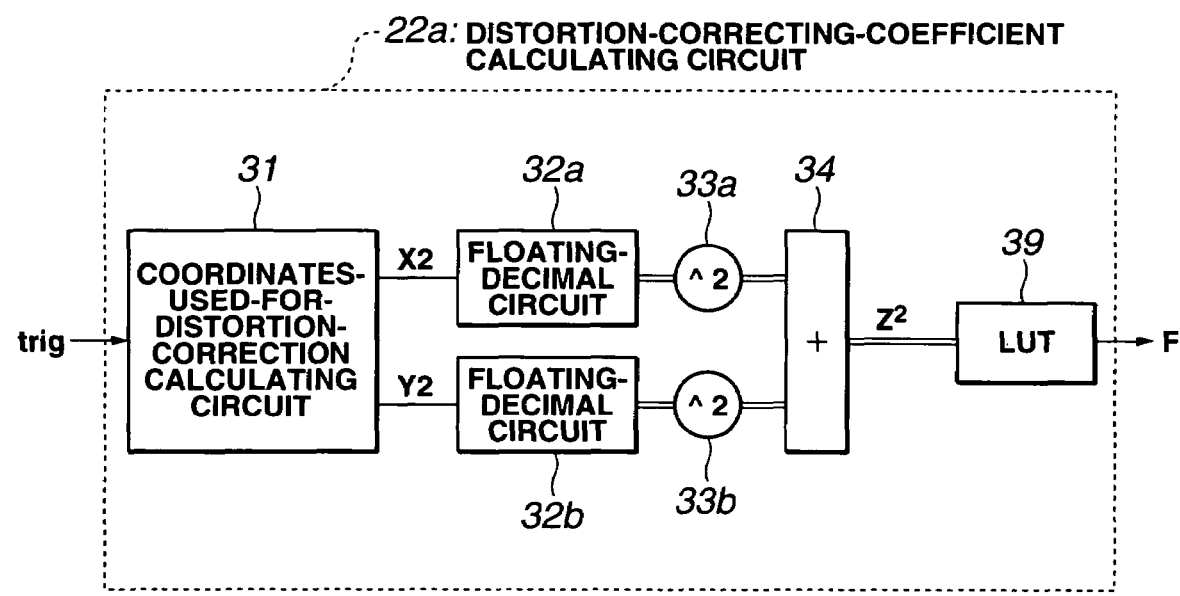
FIG. 18 is a block diagram showing another example of the configuration of the distortion-correcting-coefficient calculating circuit according to the second embodiment.

FIG. 18 is a block diagram showing another example of the configuration of the distortion-correcting-coefficient calculating circuit 22a.

Referring to FIG. 18, the distortion-correcting-coefficient calculating circuit 22a comprises: the coordinates-used-for-distortion-correction calculating circuit 31; the floating-decimal circuit 32a; the floating-decimal circuit 32b; the squaring calculator 33a; the squaring calculator 33b; the adder 34; and an LUT (Look-Up Table) 39 that outputs the distortion correcting coefficient F, converted into fixed decimal, by referring to the square of Z (specifically, Z (2 dots) as mentioned above, hereinafter, similar), converted into floating decimal, outputted from the adder 34.

Referring to FIG. 18, a portion shown by a double line is a portion at which the calculation processing is performed by using a floating decimal.

With the configuration example shown in FIG. 18, by using the LUT, the processing time for calculating the distortion correcting coefficient F is reduced and the power consumption of circuit is reduced.

With the configuration example, the coefficients A, B, and C are not set from the CPU 3 but are fixed of course, when the scale of the LUT is allowable to enlarge, the look-up table may be prepared, corresponding to a plurality of combinations of the coefficients A, B, and C, thus the proper look-up table may be used.

Figure 19:
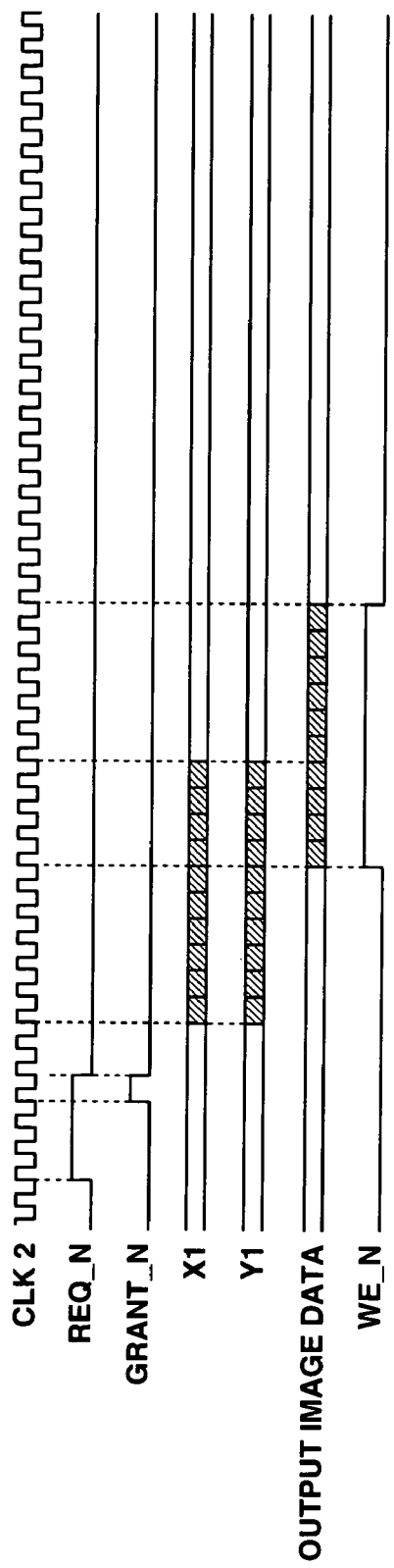
FIG. 19 is a timing chart showing the state of generating the interpolating position every clock according to the second embodiment.
Figure 20:
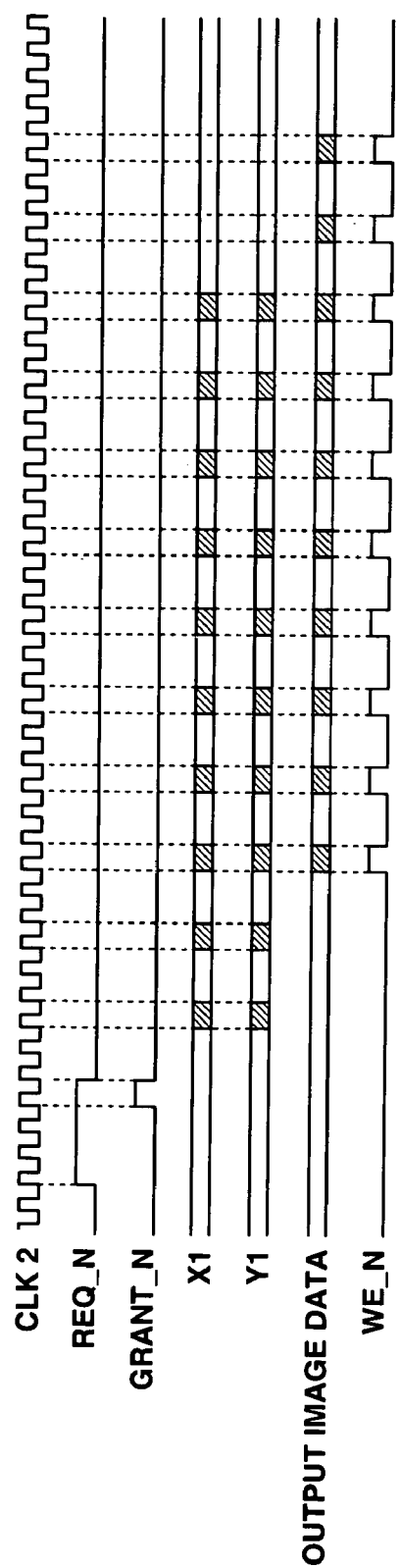
FIG. 20 is a timing chart showing the state of generating one interpolating position every three clocks according to the second embodiment.

FIG. 19 is a timing chart showing the state of generating the interpolating position every clock. FIG. 20 is a timing chart showing the state of generating the interpolating position one time for 3 clocks.

FIG. 19 shows the state of the operation for generating the interpolating position every clock. The subsequent-stage processing block inputs a request signal REQ_N to the GRANT_N transmission determining circuit 24e, and then the GRANT_N transmission determining circuit 24e sends the grant signal GRANT_N to the subsequent-stage processing block when the image data can be outputted.

The grant signal GRANT_N is inputted to the interpolating-position calculating circuit 21a, thereby generating and outputting the interpolating positions X1 and Y1. In the example shown in FIG. 19, the interpolating positions X1 and Y1 are outputted every clock.

After a predetermined processing time, the interpolating circuit 26a outputs the interpolated image data to the subsequent-stage processing block. In this case, the read-address generating circuit 24a outputs the write enable signal WE_N.

FIG. 20 is a diagram showing the state of the operation for generating the interpolating position one time for 3 clocks.

The operation until the grant signal GRANT_N is inputted to the interpolating-position calculating circuit rotor 21a is similar to that shown in FIG. 19. However, the interpolating-position calculating circuit 21a thereafter generates and outputs the interpolating positions X1 and Y1 one time for 3 clocks.

The necessary time from the generation of the interpolating positions X1 and Y1 to the output of the image after the interpolation from the interpolating circuit 26a is the same as that shown in FIG. 19. However, the interpolating positions X1 and Y1 are generated once per 3 clocks and therefore the image data after the interpolation is outputted one time for 3 clocks. In accordance therewith, the write enable signal WE_N is outputted one time for 3 clocks.

Incidentally, the interpolating position is generated every clock or once per 3 clocks. However, the present invention is not limited to this and the interpolating position may be generated once per proper plural times, or alternatively, the interpolating position may be generated m times per n times ($n \geq m$) (e.g., two times for 3 clocks). Thus, the interpolating position may be generated at an arbitrary frequency. Further, the ratio of generating times of the interpolating position to the number of clocks may be dynamically changed.

According to the second embodiment, the same advantages as those according to the first embodiment are obtained. Further, the distortion correction processing and the enlarging and reducing processing can be simultaneously performed by one circuit. The processing time can be reduced, thereby reducing the circuit scale. Thus, the fast image processing apparatus can be configured with low costs.

Upon stopping the clocks supplied to the distortion-correcting-coordinate converting unit when no distortion correction is performed, that is, the supply of clocks to the distortion-correcting-coefficient calculating circuit and the interpolating-position correcting circuit stops, thereby reducing the power consumption.

Further, the coordinates of the interpolating-position calculating circuit are not calculated every clock as occasion demands (at the interval of clocks, not every clock), thereby distributing the power consumption in time direction. The number of calculating times of coordinates per unit time is adaptively changed, thereby more effectively distributing the power consumption. Thus, the increase in temperature of the processing circuit is suppressed and the instantaneous power consumption (peak power consumption) of the entire image processing apparatus is reduced.

The interpolating coordinate data is generated based on the practical formula obtained by modification so as to reduce the number of multiplying times, as compared with the case based on the basic formula, thereby reducing the number of multipliers arranged in the interpolating-position generating unit or the distortion-correcting-coordinate converting unit. Thus, the circuit scale is reduced.

In addition, the distance Z (or Z (2 dots)) between the position $(X_d, Y_d)$ of the center of distortion and the position corresponding to the target pixel (X, Y) in the image after correction of the distortion (that is, position taking into consideration $X_{off}, Y_{off}, M, S_X$, and $S_Y$ for the coordinates (X,Y)) has a wide dynamic range. The square, fourth power, and sixth power of the distance Z have a further wide dynamic range. The calculation is performed by using the second power, fourth power, and the sixth power as floating decimal, and the distortion correcting coefficients are calculated, thereby reducing the circuit scale while keeping the precision.

Upon using the look-up table which is referred to based on the distance Z (or Z (2 dots) (or the square of the distance Z) upon obtaining the distortion correcting coefficient, the circuit scale is reduced while reducing the processing time.

FIGS. 21 to 31 show a third embodiment of the present invention. According to the third embodiment, the same portions as those according to the first and second embodiments are not described and only different portions are mainly described.

The configuration of a main portion of the image processing apparatus according to the third embodiment is similar to that shown in FIG. 15 according to the second embodiment.

Figure 29:
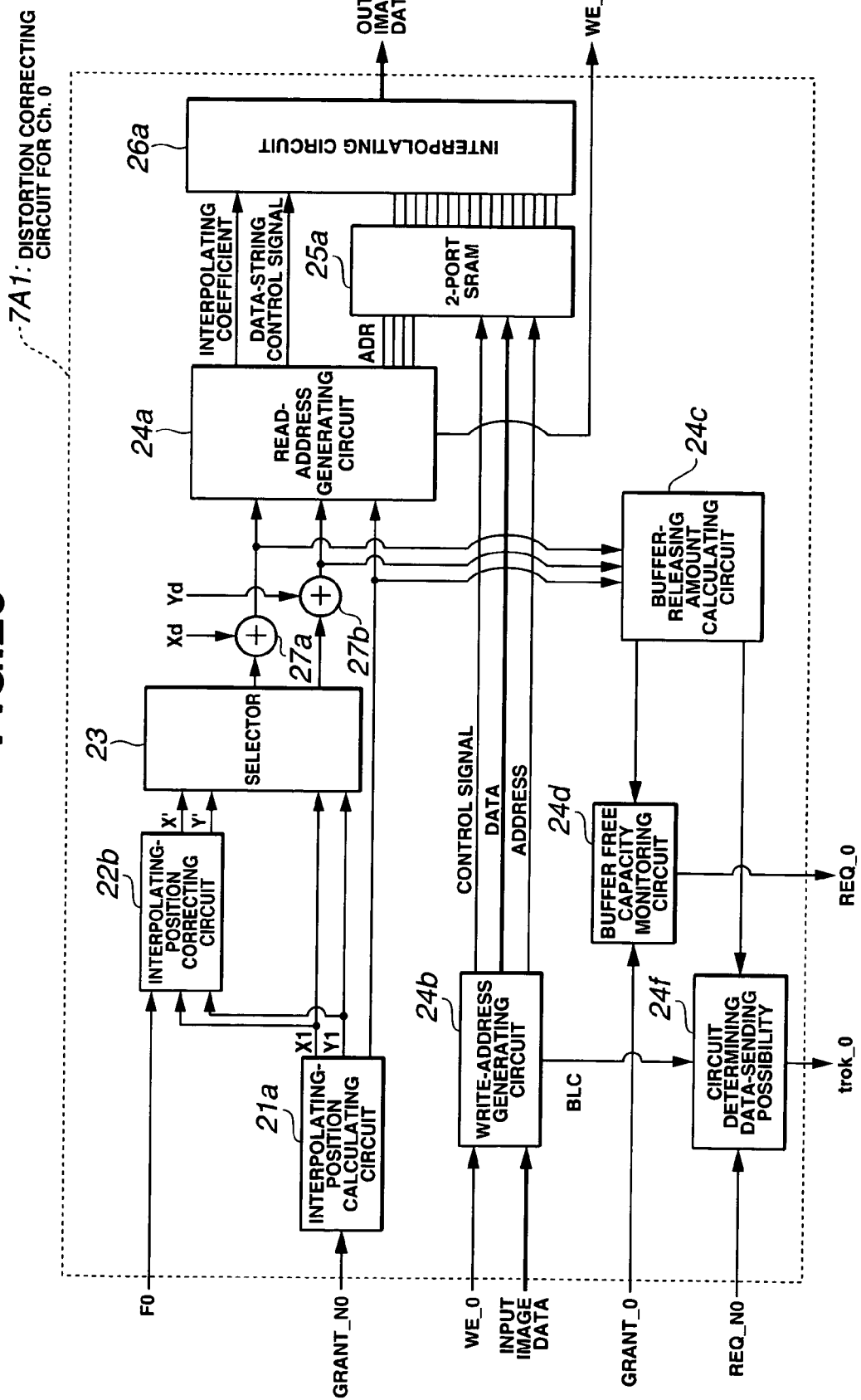
FIG. 29 is a block diagram showing the configuration of a distortion correcting circuit dedicated to Ch.0 according to the third embodiment.

An inner buffer for reducing the capacity by transferring the image data in units of a predetermined number of blocks is an inner memory unit 25 shown in FIG. 2 or a 2-port SRAM 25a shown in FIG. 29 according to the third embodiment.

Figure 21:
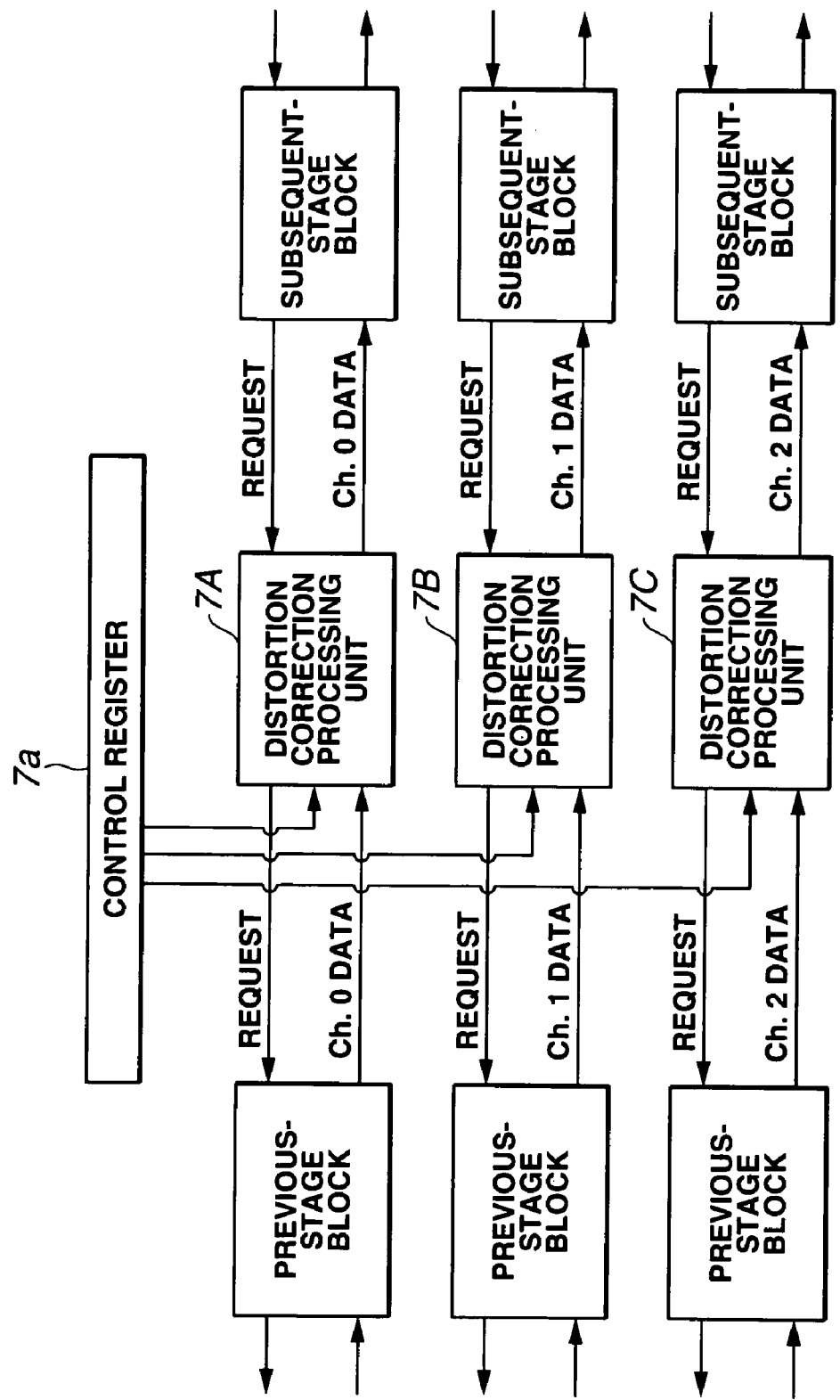
FIG. 21 is a block diagram showing the outline of the configuration of a distortion correction processing unit according to the third embodiment.

FIG. 21 is a block diagram showing the configuration of the distortion correction processing unit 7.

The color image data is generally resolved into three (or more) independent signal components, such as RGB and YCbCr signals, and then is processed every component. Here, a description is given of channels Ch.0, Ch.1, and Ch.2 for processing the three independent signal components. Specifically, a signal processed by the channel Ch.0 becomes the signal R. A signal processed by the channel Ch.1 becomes the signal G. A signal processed by the channel Ch.2 becomes the signal B.

In the distortion correction processing unit 7, the distortion correction processing unit of each channel sends a request to the previous-stage processing block corresponding to the channel, receives the image data sent from the previous-stage processing block in response to the request in units of a predetermined number of blocks, corrects the distortion, and thereafter outputs the subsequent-stage processing block corresponding to the channel. Specifically, a distortion correction processing unit 7A processes Ch.0 data, a distortion correction processing unit 7B processes Ch.1 data, and a distortion correction processing unit 7C processes Ch.2 data. The distortion correction processing unit 7 includes the distortion correction processing units 7A to 7C. Incidentally, the distortion correction processing unit 7A, 7B, and 7C receive a request indicating that the image data is to be sent from the subsequent-stage processing block. Then, at the sending timing, the distortion correction processing unit 7A, 7B, and 7C send the image data to the subsequent-stage processing block in units of a predetermined number of blocks.

In the configuration example as shown in FIG. 15, the previous-stage processing block corresponds to the image processing unit 6, and the subsequent-stage processing block corresponds to the JPEG processing unit 9. The previous-stage and subsequent-stage processing blocks perform the processing every channel.

The distortion correction processing unit 7 additionally has a control register 7a which sets, to the distortion correction processing units 7A to 7C, setting values or various data to the distortion correction processing unit 7 from the CPU 3 and simultaneously reads the statuses of the processing result from the CPU 3.

The outline of the processing of one channel of the distortion correction processing unit 7 is the same as that described with reference to FIGS. 4A, 4B and 5.

The distortion correction processing unit 7 of one channel for the above-described processing is the same as that shown in FIG. 2.

In the interpolating position generating unit 21 and the distortion-correcting-coordinate converting unit 22, the basic formula for calculating the coordinates and a practical formula for reducing the circuit scale by modifying the basic formula are the same as those described with reference to the Formula 1 to Formula 3 and the Formula 5 to Formula 16 according to the second embodiment.

In this case, a distortion-correcting-coefficient calculating circuit 22a, serving as distortion-correcting-coefficient calculating means of the distortion-correcting-coordinate converting unit 22, which will be described later with reference to FIG. 26, calculates the distortion correcting coefficient F as shown in the Formula 16. In place of the configuration shown in FIG. 26, the configuration shown in FIG. 28 may be used, as will be described later.

Further, a interpolating-position correcting circuit 22b of the distortion-correcting-coordinate converting unit 22 calculates the coordinates (interpolating coordinate data) (X',Y') of the target point before procession of the distortion correction by the Formula 12 as shown in FIG. 29, which will be described later.

Figure 22:
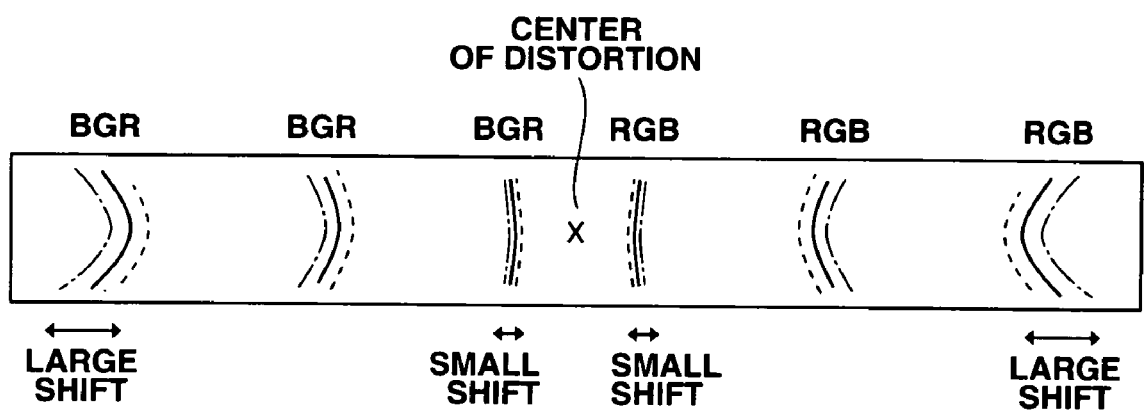
FIG. 22 is a diagram showing one example of the chromatic aberration caused in the case of shooting the image through the optical system according to the third embodiment.

FIG. 22 is a diagram showing an example of the chromatic aberration which is generated upon capturing the image by the optical system.

In the example shown in FIG. 22, a pincushion distortion-aberration is caused, and the chromatic aberrations are caused so that red R is inside of green G in view of the center of distortion and blue B is outside of green G in view of the center of distortion. The shift due to the chromatic aberrations increases as the position is more apart from the center of distortion.

As mentioned above, the interpolating processing is performed every color as shown in FIG. 21 because the chromatic aberrations are varied depending on colors. FIG. 25 is a block diagram showing the detailed configuration of the distortion correction processing unit 7.

As distortion-correction calculating means, the distortion correction processing unit 7A comprises a distortion correcting circuit 7A1 dedicated to Ch.0, the distortion correction processing unit 7B comprises a distortion correcting circuit 7B1 dedicated to Ch.1, and the distortion correction processing unit 7C comprises a distortion correcting circuit 7C1 dedicated to Ch.2.

The distortion-correcting-coefficient calculating circuit 22a for calculating the distortion correcting coefficient F constitutes a part of the distortion-correcting-coordinate converting unit 22. The distortion-correcting-coefficient calculating circuit 22a is shared by the distortion correction processing units 7A to 7C, and therefore are arranged as a single circuit common to the three channels. Further, the distortion-correcting-coefficient calculating circuit 22a calculates a distortion correcting coefficient F1 for Ch.0, a distortion correcting coefficient F2 for Ch.1, and a distortion correcting coefficient F2 for Ch.2, and outputs the resultant data to the distortion correcting circuit 7A1 dedicated to Ch.0, the distortion correcting circuit 7B1 dedicated to Ch.1, and the distortion correcting circuit 7C1 dedicated to Ch.2.

After the interpolating processing, such as the distortion correction processing and the enlarging and reducing processing, the output operation of image data to the subsequent-stage processing block simultaneously needs the image data on the three channels, depending on the processing contents of the subsequent-stage processing block. However, as shown in FIG. 22, with the chromatic aberration, the position of the target pixel is varied, depending on the color. Therefore, three data is not simultaneously outputted.

This will be explained with reference to FIGS. 23A to 23C and 24A to 24C. FIGS. 23A to 23C are diagrams showing the state of the image data stored in the inner memory unit when interpolating data on blue B can be calculated. FIGS. 24A to 24C are diagrams showing the state of the image data stored in the inner memory unit when the respective interpolating data on red R, green G, and blue B can be calculated.

Upon simultaneously starting the calculation processing of the interpolating data of three channels, the image data from the previous-stage processing block starts to be sequentially stored in the inner memory unit 25 (2-port SRAM 25a shown in FIG. 29, which will be described later) of each channel. In this case, the data stored portion is shown by a shaded portion. At the time shown in FIGS. 23A to 23C, the image data is stored, up to the portion where the interpolating data on blue B can be calculated. However, the image data does not reach the amount of data for calculating the interpolating data on green G and ref R.

Further, at the time shown in FIGS. 24A to 24C, the image data is stored, up to the portion where the interpolating data on red R, green G, and blue B can be calculated.

As mentioned above, at the time when calculation of the interpolating data on the three channels gets enabled, a grant synchronizing circuit 27, serving as grant synchronizing means, synthesizes the image data so as to allow the transfer of image data to the subsequent-stage processing block.

When the channel Ch.0 is red R, the channel Ch.1 is green G, and the channel Ch.2 is blue B, at the time in the state shown in FIGS. 23A to 23C, the distortion correcting circuit 7A1 dedicated to Ch.0 outputs a request signal trok_0 for requesting the start of distortion correction processing. Although not shown, when the distortion correcting circuit 7B1 dedicated to Ch.1 can perform the distortion correction, a request signal trok_1 for requesting the start of distortion correction processing is outputted. At the time in the state shown in FIGS. 24A to 24C, the distortion correcting circuit 7C1 dedicated to Ch.2 outputs a request signal trok_2 for requesting the start of distortion correction processing.

After all the request signals trok_0, trok_1, and trok_2 are sent, that is, when the interpolating data can be sent by all the three channels, the grant synchronizing circuit 27 outputs the grant signal GRANT_N0 to the portion performing processing related to Ch.0 of the subsequent-stage processing block, outputs a grant signal GRANT_N1 to the portion performing processing related to Ch.1, and outputs a grant signal GRANT_N2 to the portion performing processing related to Ch.2. Further, the grant synchronizing circuit 27 controls the operation for simultaneously starting the distortion correction processing to the distortion correcting circuit 7A1 dedicated to Ch.0, the distortion correcting circuit 7B1 dedicated to Ch.1, the distortion correcting circuit 7C1 dedicated to Ch.2, as will be described later.

As will be described later, the grant synchronizing circuit 27 has therein a switch which switches whether or not the outputs from the three channels are to be synchronized.

Figure 26:
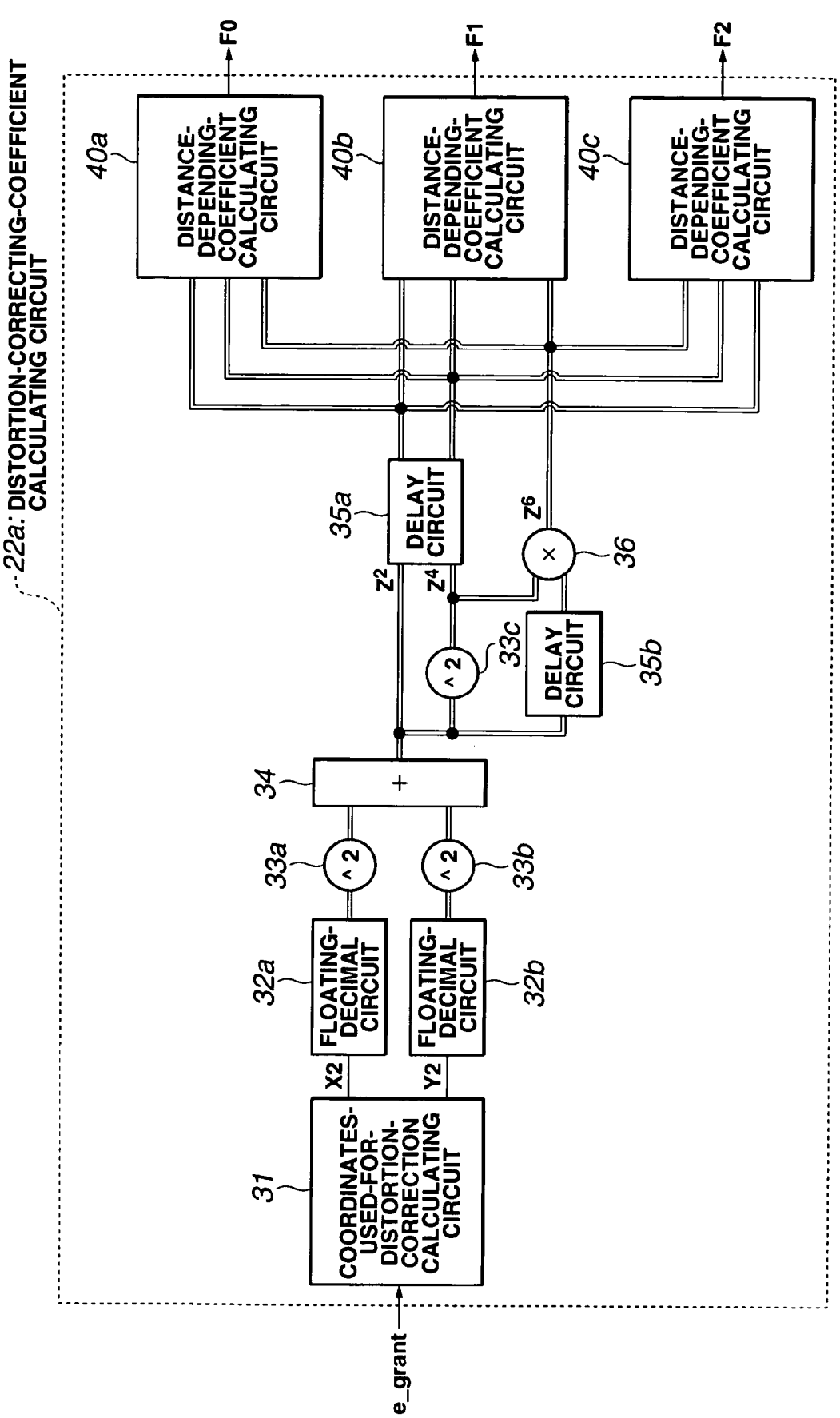
FIG. 26 is a block diagram showing one example of the configuration of a distortion-correcting-coefficient according to the third embodiment.

FIG. 26 is a block diagram showing the configuration of the distortion-correcting-coefficient calculating circuit 22a.

The distortion-correcting-coefficient calculating circuit 22a is distortion-correcting-coefficient calculating means for calculating the distortion correcting coefficient F by Formula 16. The A (dot), B (dot), and C (dot) for reflecting the optical property of the optical system in Formula 16 are set to the control register 7a from the CPU 3 every channel, that is, every color of red R, green G, and blue B.

Figure 27:
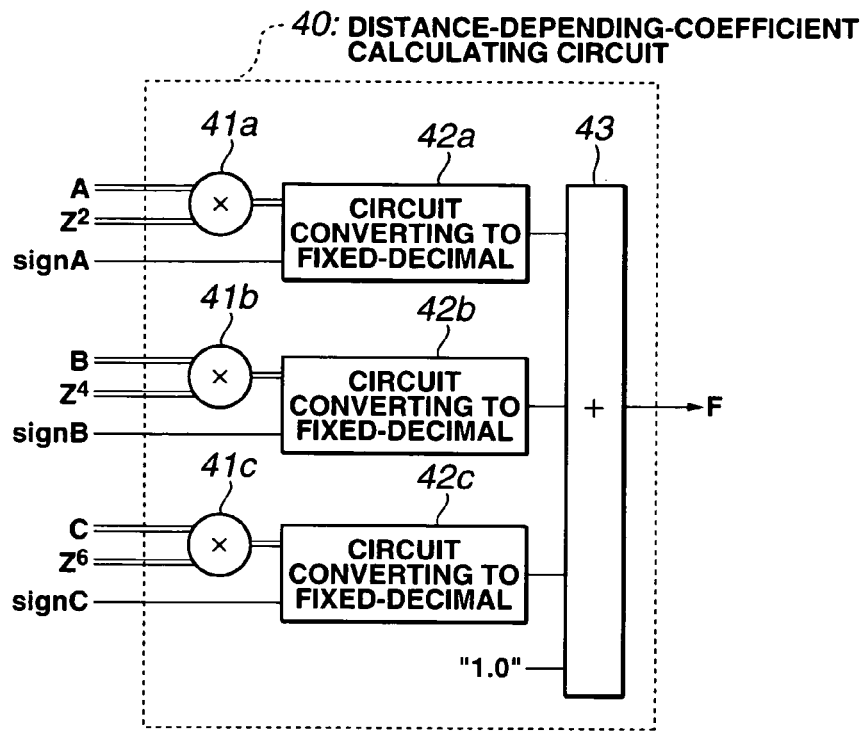
FIG. 27 is a block diagram showing the configuration of a distance-depending coefficient calculating circuit according to the third embodiment.
Figure 28:
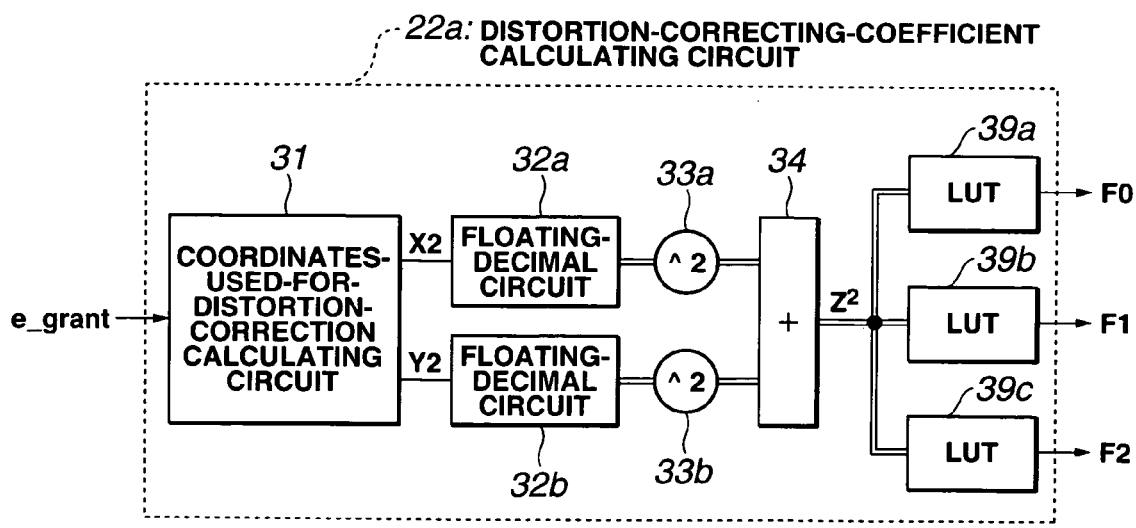
FIG. 28 is a block diagram showing another example of the configuration of the distortion-correcting-coefficient according to the third embodiment.

With reference to FIG. 26 and FIGS. 27 and 28, which will be described later, in the following description with reference to FIGS. 26 to 28, the distance Z denotes Z (2 dots) indicated in the left side of Formula 10 and the coefficients A, B, and C denote A (dot), B (dot), and C (dot) shown in the left side of Formula 13.

The distortion-correcting-coefficient calculating circuit 22a comprises: the coordinates-used-for-distortion-correction calculating circuit 31 that calculates the interpolating coordinates X2 and Y2 based on the Formula 11 when an enable signal e_grant is inputted from the grant synchronizing circuit 27; a floating-decimal circuit 32a that converts, into a floating decimal, the interpolating coordinate X2 calculated by the coordinates-used-for-distortion-correction calculating circuit 31; the floating-decimal circuit 32b that converts, into a floating decimal, the interpolating coordinate Y2 calculated by the coordinates-used-for-distortion-correction calculating circuit 31; the squaring calculator 33a for squaring the interpolating coordinate X2 converted into floating decimal by the floating-decimal circuit 32a to the second power; the squaring calculator 33b that squares the interpolating coordinate Y2 converted into floating decimal by the floating-decimal circuit 32b; the adder 34 that calculates the second power of the distance Z (specifically, Z (2 dots) as mentioned above, hereinafter, similar) by adding the square of the interpolating coordinate X2 calculated by the squaring calculator 33a and the square of the interpolating coordinate Y2 calculated by the squaring calculator 33b; the squaring calculator 33c that calculates the fourth power of the distance Z by squaring the output from the adder 34; the delay circuit 35b that delays the output from the adder 34; the multiplier 36 that calculates the sixth power of the distance Z by multiplying the fourth power of the distance Z calculated by the squaring calculator 33c and the square of the distance Z outputted at the delay timing of the delay circuit 35b; the delay circuit 35a that delays the output from the adder 34 and further delays the output from the squaring calculator 33c;

and distance-depending coefficient calculating circuits 40*a*, 40*b*, and 40*c* that calculate the distortion correcting coefficients F0, F1, and F2 for Ch.0, Ch.1, and Ch.2 by using the square of Z and the fourth power of Z outputted at the timing of the delay circuit 35*a* and the sixth power of Z outputted from the multiplier 36.

FIG. 27 is a block diagram showing the configuration of any of the distance-depending-coefficient calculating circuits 40*a*, 40*b*, and 40*c*.

The distance-depending-coefficient calculating circuit 40 comprises: a multiplier 41*a* that multiplies the coefficient A (specifically, A (dot) as mentioned above, hereinafter, similar) set to the control register 7*a* from the CPU 3 to the square of Z outputted at the delay timing of the delay circuit 35*a*; a multiplier 41*b* that multiplies the coefficient B (specifically, B (dot) as mentioned above, hereinafter, similar) set to the control register 7*a* from the CPU 3 to the fourth power of Z outputted at the delay timing of the delay circuit 35*a*; a multiplier 41*c* that multiplies the coefficient C (specifically, C (dot) as mentioned above, hereinafter, similar) set to the control register 7*a* from the CPU 3 to the sixth power of Z outputted from the multiplier 36; a circuit converting to fixed-decimal 42*a* that sends, to the output from the multiplier 41*a*, the sign signA of the coefficient A set to the control register 7*a* from the CPU 3 and converts the data to a fixed decimal; a circuit converting to fixed-decimal 42*b* that sends, to the output from the multiplier 41*b*, the sign signB of the coefficient B set to the control register 7*a* from the CPU 3 and converts the data to a fixed decimal; a circuit converting to fixed-decimal 42*c* that sends, to the output from the multiplier 41*c*, the sign signC of the coefficient C set to the control register 7*a* from the CPU 3 and converts the data to a fixed decimal; and an adder 43 that adds the output from the circuit converting to fixed-decimal 42*a*, the output from the circuit converting to fixed-decimal 42*b*, the output from the circuit converting to fixed-decimal 42*c*, and a constant 1.0 set to the control register 7*a* from the CPU 3, thereby calculating the distortion correcting coefficient F (any of the distortion correcting coefficients F0, F1, and F2) based on the Formula 16.

Referring to FIGS. 26 and 27, a portion shown by a double line is subjected to the calculation processing using a floating decimal. The numerals X2, Y2 and Z having the wide dynamic range are treated as floating decimal, thereby reducing the circuit scale while ensuring the precision.

In this case, referring to FIG. 26, a part of the distortion-correcting-coefficient calculating circuit 22*a*, that is, the coordinates-used-for-distortion-correction calculating circuit 31, the floating-decimal circuits 32*a* and 32*b*, the squaring calculators 33*a*, 33*b*, and 33*c*, the adder 34, the delay circuits 35*a* and 35*b*, and the multiplier 36 are common without depending on the channels. Thus, the circuit scale is reduced and the power consumption is reduced.

FIG. 28 is a block diagram showing another example of the configuration of the distortion-correcting-coefficient calculating circuit 22*a*.

The distortion-correcting-coefficient calculating circuit 22*a* shown in FIG. 28 comprises: the coordinates-used-for-distortion-correction calculating circuit 31; the floating-decimal circuits 32*a* and 32*b*; the squaring calculator 33*a*; the squaring calculator 33*b*; the adder 34; and LUTs (look-up tables) 39*a*, 39*b*, and 39*c* that output the distortion correcting coefficients F0, F1, and F2 converted to fixed decimals, by referring to the square of Z (specifically, Z (2 dots) as mentioned above, hereinafter, similar) converted to floating decimal and outputted from the adder 34.

Referring to FIG. 28, a portion shown by a double line is a portion at which the calculation processing is performed by using a floating decimal.

With the configuration in the example shown in FIG. 28, by using the LUTS, the processing time for calculating the distortion correcting coefficients F0, F1, and F2 is reduced and the power consumption of circuit is reduced.

With the configuration in the example, the coefficients A, B, and C for channels are not set from the CPU 3, but are fixed values. Of course, when the scale of the LUTS is allowable to enlarge, the look-up tables may be prepared for channels, corresponding to a plurality of combinations of the coefficients A, B, and C, and the proper look-up table may be used.

FIG. 29 is a block diagram showing the configuration of the distortion correcting circuit 7A1 dedicated to Ch.0. The configurations of the distortion correcting circuit 7B1 dedicated to Ch.1 and the distortion correcting circuit 7C1 dedicated to Ch.2 are the same as that of the distortion correcting circuit 7A1 dedicated to Ch.0. Therefore, only the distortion correcting circuit 7A1 dedicated to Ch.0 will be described here.

The interpolating-position calculating circuit 21*a* calculates the coordinates (X1, Y1) of the target point as mentioned above, corresponding to the interpolating position generating unit 21.

The interpolating-position correcting circuit 22*b* calculates the coordinates (X', Y') of the target point before procession of the distortion correction as shown in the Formula 12 by using the distortion correcting coefficient F0 calculated by the distortion-correcting-coefficient calculating circuit 22*a*, and partly constitutes the distortion-correcting-coordinate converting unit 22.

In the case that the distortion correction processing is not performed, (irrespective of whether or not the enlarging and reducing processing is performed), the selector 23 selects the coordinates (X1, Y1) from the interpolating-position calculating circuit 21*a*. In the case that the distortion correction processing is performed, (irrespective of whether or not the enlarging and reducing processing is performed), the selector 23 selects the coordinates (X', Y') from the interpolating-position correcting circuit 22*b*.

The adders 27*a* and 27*b* add the coordinates $(X_d, Y_d)$ of the center of distortion set by the CPU 3 via the control register 7*a* to the coordinates (X1, Y1) or (X', Y') selected by the selector 23.

The outputs from the adders 27*a* and 27*b* are outputted to the read-address generating circuit 24*a* and the buffer-releasing amount calculating circuit 24*c*.

Further, the coordinates (X1, Y1) calculated by the interpolating-position calculating circuit 21*a* are inputted to the read-address generating circuit 24*a*, via another channel of the one via the selector 23. The read-address generating circuit 24*a* outputs, to the 2-port SRAM 25*a*, the address ADR for storing the pixel data on the coordinates (X1, Y1) (16 pieces of pixel data around the coordinates (X1, Y1) as center in the 16-point interpolation), and outputs, to the interpolating circuit 26*a*, the interpolating coefficients (e.g., interpolating coefficients $k_{x0}$ to $k_{x3}$ and $k_{y0}$ to $k_{y3}$ as shown in the Formula 5) and the data string control signal indicating which of pixel data $D_0$ to $D_{15}$ is outputted. Further, the read-address generating circuit 24*a* outputs the write enable signal WE_N0 to the channel Ch.0 of the subsequent-stage processing block.

The 2-port SRAM 25*a* is a circuit portion corresponding to the inner memory unit 25 shown in FIG. 2.

The interpolating circuit 26*a* corresponds to the interpolation calculating unit 26 shown in FIG. 2, and performs the interpolating processing as shown in the Formula 5 by using the image data read from the 2-port SRAM 25a and outputs the image data after the processing to the subsequent-stage processing block.

The buffer-releasing amount calculating circuit 24c calculates the storage capacity (released amount of buffer) of the 2-port SRAM 25a based on the output from the interpolating-position calculating circuit 21a and the output from the selector 23 via the adders 27a and 27b.

The buffer free-capacity monitoring circuit 24d refers to the output of the buffer-releasing amount calculating circuit 24c, and checks the free capacity of the 2-port SRAM 25a.

The write-address generating circuit 24b receives the image data on the channel Ch.0 from the previous-stage processing block, and records the image data to the 2-port SRAM 25a.

A circuit determining data-sending possibility 24f receives a request signal REQ_N0 for requesting the image data from the subsequent-stage processing block related to the channel Ch.0, determines, based on the outputs of the write-address generating circuit 24b and the buffer-releasing amount calculating circuit 24c, whether or not the image data is set, and outputs a request signal trok_0 to the grant synchronizing circuit 27 when it is determined that the image data is sent.

Next, a description is given of the operation of the distortion correction processing unit 7 shown in FIG. 29.

The buffer free-capacity monitoring circuit 24d monitors the free capacity of the 2-port SRAM 25a via the buffer-releasing amount calculating circuit 24c. When the 2-port SRAM 25a has a predetermined free capacity, the buffer free-capacity monitoring circuit 24d issues a request signal REQ_0 so as to send the image data in units of a predetermined number of blocks (hereinafter, properly referred to a unit line (UL) data) to the previous-stage processing block on the channel Ch.0 (in step S21).

The previous-stage processing block associated with the channel Ch.0 receives the request signal REQ_0, and sends a grant signal GRANT_0 when the image data can be sent. The buffer free-capacity monitoring circuit 24d receives the grant signal GRANT_0 (in step S22).

The buffer free-capacity monitoring circuit 24d checks the free capacity of the 2-port SRAM 25a by a counter held therein, and receives the grant signal GRANT and simultaneously decrements the value of the counter. When the inner counter counts 0, the buffer free-capacity monitoring circuit 24d operates such that the request signal REQ_0 is deleted (in step S23).

The previous-stage processing block associated with the channel Ch.0 inputs a write enable signal WE_0 to the write-address generating circuit 24b. Subsequently, the image data is inputted to the write-address generating circuit 24b. In accordance therewith, the write-address generating circuit 24b outputs a control signal to the 2-port SRAM 25a, and writes the image data DATA to an area designated by an address ADDRESS of the 2-port SRAM 25a. The write-address generating circuit 24b counts-up a BLC counter (counter indicating what amount of data is stored in the 2-port SRAM 25a, serving as the inner buffer) every input operation of UL data, and outputs the resultant data to the circuit determining data-sending possibility 24f (in step S24).

The circuit determining data-sending possibility 24f receives a request signal REQ_N0 from the subsequent-stage processing block associated with the channel Ch.0, and then determines whether or not the UL data to be next sent exists in the 2-port SRAM 25a. When it is determined that the UL data to be next sent exists in the 2-port SRAM 25a, the circuit determining data-sending possibility 24f sends a request signal trok_0 to the grant synchronizing circuit 27 (in step S25).

As will be described later, the grant synchronizing circuit 27 outputs grant signals GRANT_N0, GRANT_N1, and GRANT_N2 to the subsequent-stage processing block related to each channel and the interpolating-position calculating circuit 21a associated with each channel when the sending condition of the image data is satisfied.

The interpolating-position calculating circuit 21a associated with channel Ch.0 receives the grant signal GRANT_N0 and starts the operation. Then, the interpolating-position calculating circuit 21a calculates the coordinates (X1,Y1), serving as the interpolating position, corresponding to one piece of UL data, calculates the coordinates of the head of the next UL data (in step S26).

The interpolating-position calculating circuit 21a starts the operation and then outputs the coordinates (X1, Y1). Synchronously therewith, the grant synchronizing circuit 27 outputs a grant signal e_grant to the distortion-correcting-coefficient calculating circuit 22a at the timing for outputting the distortion correcting coefficient F0 by the distortion-correcting-coefficient calculating circuit 22a (in step S27).

The distortion-correcting-coefficient calculating circuit 22a receives the grant signal e_grant, then, calculates the distortion correcting coefficients F0, F1, and F2 associated with the channels based on the Formula 16, and outputs the calculating result to the interpolating-position correcting circuit 22b for each channel. Similarly to the interpolating-position calculating circuit 21a, the distortion-correcting-coefficient calculating circuit 22a performs the operation corresponding to one piece of UL data, then, calculates the coordinates of the head of the next UL data, and ends the operation (in step S28).

The interpolating-position correcting circuit 22b for channel Ch.0 calculates the coordinates (X', Y') based on the Formula 12 by using the distortion correcting coefficient F0 received from the distortion-correcting-coefficient calculating circuit 22a and the coordinates (X1,Y1) received from the interpolating-position calculating circuit 21a. The interpolating-position correcting circuit 22b performs the operation corresponding to one piece of UL data in accordance with the distortion-correcting-coefficient calculating circuit 22a, then, calculates the coordinate of the head of the next UL data, and ends the operation (in step S29).

The selector 23 selects the coordinates (X', Y') from the interpolating-position correcting circuit 22b in accordance with the operating mode set by the CPU 3 via the control register 7a, when the distortion is to be corrected. When the distortion is not to be corrected, the selector 23 selects the coordinates (X1, Y1) from the interpolating-position generating circuit 21a (in step S30).

The adders 27a and 27b add the coordinates $(X_d, Y_d)$ Of the center of distortion to the coordinates (X1, Y1) or (X', Y') selected by the selector 23 (in step S31).

The read-address generating circuit 24a outputs, to the 2-port SRAM 25a, the address ADR of the pixel data read from the 2-port SRAM 25a for interpolation based on the coordinates received from the adders 27a and 27b, and outputs the interpolating coefficient and the data string control signal to the interpolating circuit 26a (in step S32).

The interpolating circuit 26a calculates the interpolated pixel data as shown in the Formula 5 by using the interpolating coefficient and the data string control signal received from the read-address generating circuit 24a and the pixel data received from the 2-port SRAM 25a, and outputs the calculating result to the subsequent-stage processing block associated with the channel Ch.0 (in step S33).

The buffer-releasing amount calculating circuit 24c confirms that the UL data is outputted up to the last portion, based on the outputs from the interpolating-position calculating circuit 21a and the adders 27a and 27b, and then calculates the difference between the coordinates of the head of the UL data that is completely processed immediately before and the coordinates of the head of the next UL data. In order to release the buffer (area in the 2-port SRAM 25a) storing unnecessary data, the releasing amount of buffer is outputted to the buffer free-capacity monitoring circuit 24d, and it is sent to the circuit determining data-sending possibility 24f, about what amount of data for processing the next UL data is to be received from the previous-stage processing block associated with channel Ch.0 (in step S34).

When it is determined in step S34 that the 2-port SRAM 25a, serving as the inner buffer, has a free storage area, the buffer free-capacity monitoring circuit 24d returns to step S21 whereupon the above-described processing repeats (in step S35).

The circuit determining data-sending possibility 24f determines, based on the value of the BLC counter from the write-address generating circuit 24b and the output from the buffer-releasing amount calculating circuit 24c, whether or not the next UL data can be sent to the subsequent-stage processing block. When it is determined that the next UL data can be sent, the circuit determining data-sending possibility 24f performs the processing in step S25 (in step S36).

Figure 30:
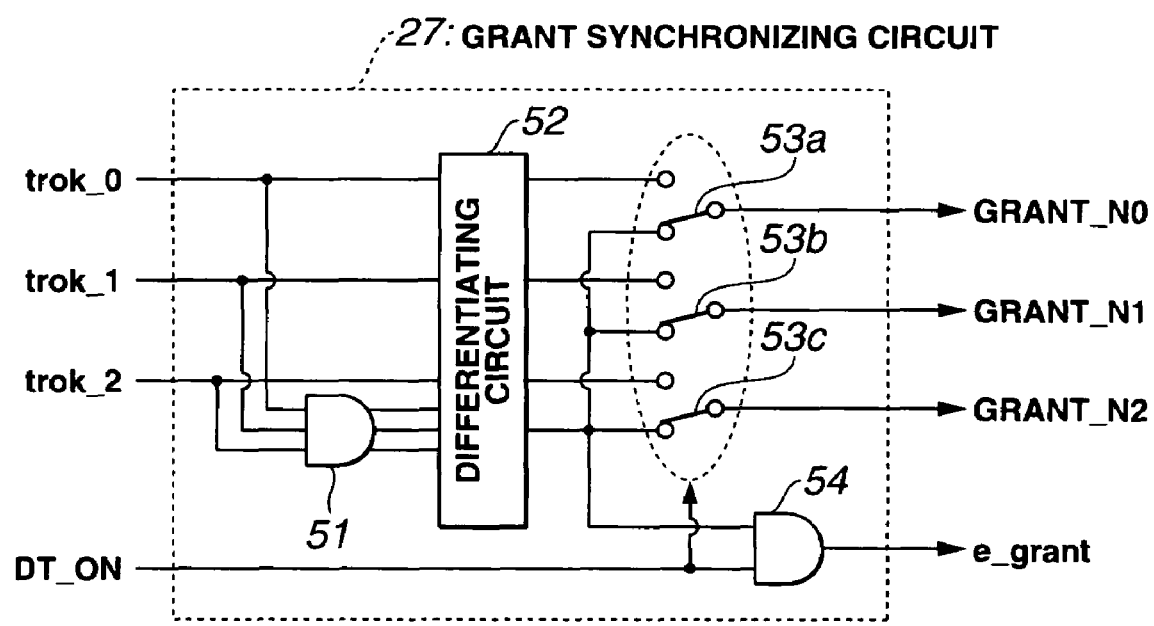
FIG. 30 is a block diagram showing the configuration of a grant synchronizing circuit according to the third embodiment.
Figure 31:
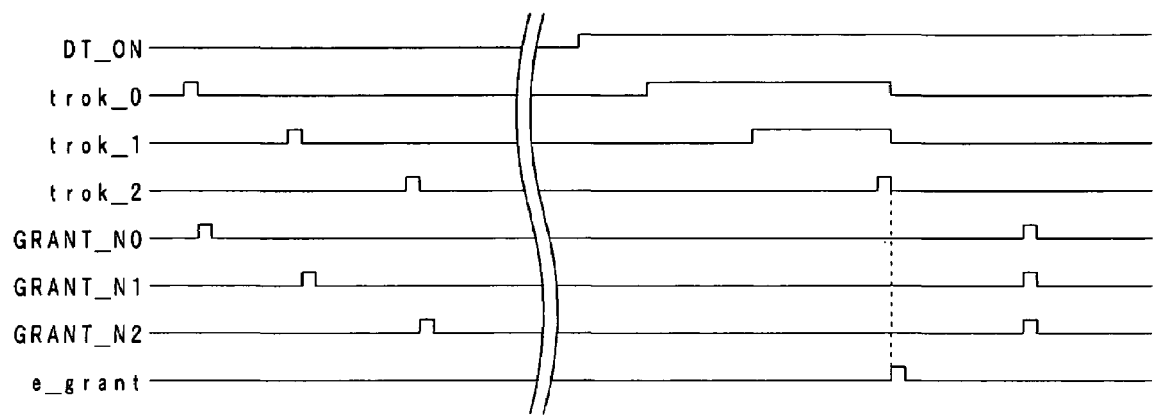
FIG. 31 is a timing chart for explaining the operation of the grant synchronizing circuit according to the third embodiment.
Figure 34:
FIG. 34 is a diagram for explaining the amount of memory necessary for conventional distortion correction processing.

FIG. 30 is a block diagram showing the configuration of the grant synchronizing circuit 27. FIG. 31 is a timing chart for explaining the operation of the grant synchronizing circuit 27.

First, data DT_ON obtained by referring to the control register 7a holds a Boolean value indicating whether or not the distortion is corrected. When the data DT_ON is 0 (false), the data DT_ON is obtained as the low level signal. When the data DT_ON is 1 (true), the data DT_ON is obtained as the high level signal.

The grant synchronizing circuit 27 comprises: an AND circuit 51 that performs the AND operation of the request signal trok_0 from the distortion correcting circuit 7A1 dedicated to channel Ch.0, the request signal trok_1 from the distortion correcting circuit 7B1 dedicated to channel Ch.1, and the request signal trok_2 from the distortion correcting circuit 7C1 dedicated to channel Ch.2; a differentiating circuit 52 that detects the rise of the request signals trok_0, trok_1, and trok_2 and the output of the AND circuit 51; a switch 53a that is switched to be connected to the outputting side of the differentiating circuit 52 associated with the request signal trok_0 when the data DT_ON is at the low level and to be connected to the outputting side of the differentiating circuit 52 associated with the AND circuit 51 when the data DT_ON is at the high level; a switch 53b that is switched to be connected to the outputting side of the differentiating circuit 52 associated with the request signal trok_1 when the data DT_ON is at the low level and to be connected to the outputting side of the differentiating circuit 52 associated with the AND circuit 51 when the data DT_ON is at the high level; a switch 53c that is switched to be connected to the outputting side of the differentiating circuit 52 associated with the request signal trok_2 when the data DT_ON is at the low level and to be connected to the outputting side of the differentiating circuit 52 associated with the AND circuit 51 when the DT_ON data is at the high level; and an AND circuit 54 that performs the AND operation of the output of the differentiating circuit 52 of the AND circuit 51 and the data DT_ON and outputs the AND operation result, as the grant signal e_grant, to the coordinates-used-for-distortion-correction calculating circuit 31 of the distortion-correcting-coefficient calculating circuit 22a.

The operation of the grant synchronizing circuit 27 is as follows.

When the data DT_ON is at the low level, that is, when no distortion correction is performed, the switches 53a, 53b, and 53c are switched to the outputting side of the differentiating circuit 52 associated with detection of the request signals trok_0, trok_1, and trok_2.

In this case, as shown on the left of FIG. 31, the signal at the high level is inputted to the request signal trok_0 and then the differentiating circuit 52 detects the rise thereof. Then, the differentiating circuit 52 outputs a signal GRANT_N0. Next, the signal at the high level is inputted to the request signal trok_1 and then the differentiating circuit 52 detects the rise thereof. Then, the differentiating circuit 52 outputs a signal GRANT_N1 and the signal at the high level is thereafter inputted to the request signal trok_2. The differentiating circuit 52 detects the rise of the signal and outputs a signal GRANT_N2 As mentioned above, when the data DT_ON is at the low level, the image data from the three channels is outputted every channel at the individual timing.

When the data DT_ON is at the low level, the output of the AND circuit 54 is at the low level yet, irrespective of the output of the AND circuit 51, and the grant signal e_grant is not outputted (or a non-grant signal is outputted). Therefore, the distortion-correcting-coefficient calculating circuit 22a does not calculate the distortion correcting coefficients F0, F1, and F2. Thus, the interpolating-position correcting circuit 22b for each channel does not operate and, after all, the distortion interpolating processing is not executed.

When the data DT_ON is at the high level, that is, when the distortion correction is performed, the switches 53a, 53b, and 53c are switched to the outputting side of the differentiating circuit 52 of the AND circuit 51.

In this case, as shown on the right in FIG. 31, when the signal at the high level is inputted to the request signal trok_0, the request signals trok_1 and trok_2 are at the low level at this timing. The output of the AND circuit 51 maintains the low level.

Thereafter, even when the request signal trok_0 is at the high level and the request signal trok_1 is at the high level, the output of the AND circuit 51 is at the low level yet during the request signal trok_2 is at the low level.

When all of request signals trok_0, trok_1, and trok_2 are at the high level, the output of the AND circuit 51 is at the high level and the differentiating circuit 52 detects the rise of the signal.

The output of the differentiating circuit 52 is simultaneously outputted, as the grant signals GRANT_N0, GRANT_N1, and GRANT_N2 and is further outputted to the AND circuit 54. Then, the AND operation of the output and the data DT_ON at the high level is performed. The grant signal e_grant is outputted to the distortion-correcting-coefficient calculating circuit 22a.

As mentioned above, when the data DT_ON is at the high level, the image data from the three channels is outputted at the synchronous timing.

According to the third embodiment, the same advantages as those according to the first and second embodiments are obtained. Further, an image processing apparatus for both the distortion correction and chromatic aberration correction is provided with the small circuit scale and low power-consumption.

In particular, at least one part of the distortion-correcting-coefficient calculating circuit is shared by a plurality of channels, thereby effectively reducing the circuit scale and decreasing the power consumption. In this case, a number with a wide dynamic range is converted into floating decimal for calculation and therefore the circuit scale is reduced while keeping the precision. Upon obtaining the distortion correcting coefficient by referring to the look-up table, the circuit scale is reduced while reducing the processing time.

Further, the grant synchronizing circuit is provided to simultaneously output the image data from the channels, thus preferably performing when the subsequent-stage processing block simultaneously needs the image data on a plurality of channels. In this case, the grant synchronizing circuit uses the switching operation to output the image data of the plurality of channels at the individual timing and therefore selects the image data in accordance with the necessity.

In addition, the interpolating coordinate data is generated based on the practical formula modified to reduce the number of multiplying times, as compared with the case using the basic formula. Thus, the number of multipliers arranged in the interpolating position generating portion or the distortion-correcting-coordinate converting unit is reduced, thereby reducing the circuit scale.

Advantageously, the enlarging and reducing processing can be simultaneously performed by the same circuit as that of the distortion correction processing.

The present invention is not limited to the first to third embodiments and can be modified or can be varied without departing the essentials of the present invention.

What is claimed is:

1. An image processing apparatus for processing electronic image data obtained by an image pickup operation via an optical system, the image data having pixel data two-dimensionally-arranged in a row direction and a column direction, the image processing apparatus comprising:
   a memory that stores the image data at least before image processing and further stores the image data after image procession;
   a first data-order converting unit that sequentially reads the pixel data row by row in a row direction in units of a block of the two-dimensional arrangement of the image data via a bus from the memory and thereafter sequentially outputs the pixel data in the block obtained by reading column by column in the column direction to change an order of the image data;
   an image processing unit that is connected to the first data-order converting unit for performing pipeline processing via an information sending channel different from the bus, inputting the image data outputted column by column in the column direction from the first data-order converting unit, performing image processing, and thereafter outputting the image data in the column direction; and
   a second data-order converting unit connected to the image processing unit for performing pipeline processing and sequentially outputting column by column in the column direction, the image data in the block obtained by inputting the image processed image data outputted in the column direction from the image processing unit, to restore the original order of the image data,
   wherein the image processing unit comprises a distortion correction processing unit that corrects distortion aberration caused by the optical system, and
   wherein the distortion correction processing unit comprises:
   an interpolating coordinate generating unit that generates interpolating coordinates;
   an inner memory unit for storing a portion of the image data; and
   an interpolation calculating unit for generating pixel data of interpolating coordinates from image data stored in the inner memory unit based on the interpolating coordinates generated by the interpolating coordinate generating unit.

2. The image processing apparatus according to claim 1, wherein the first data-order converting unit can change the size at least one of the image data in the row direction and the image data in the column direction read from the memory in units of a block.

3. The image processing apparatus according to claim 2, wherein the image data before the image procession is any of the following; the image pickup data that is obtained by photoelectrically converting, by image pickup means, a subject optical image formed by the optical system and outputted; non-compressed image data that is the image pickup data subjected, as occasion demands, to predetermined processing, excluding compressing processing; and compressed image data that is obtained by compressing processing after performing predetermined processing on the image pickup data, excluding the compressing processing, as occasion demands.

4. The image processing apparatus according to claim 1, wherein the image data before the image procession is any of the following; image pickup data that is obtained by photoelectrically converting, by image pickup means, a subject optical image formed by the optical system and outputted; non-compressed image data that is the image pickup data subjected, as occasion demands, to predetermined processing, excluding compressing processing; and compressed image data that is obtained by compressing processing after performing predetermined processing on the image pickup data, excluding the compressing processing, as occasion demands.

5. The image processing apparatus according to claim 1, wherein the interpolating-coordinate generating unit comprises:
   an interpolating-position generating unit that generates coordinates of a pixel of an interpolating target in the image after correction of the distortion; and
   a distortion-correcting-coordinate converting unit that obtains coordinates in the image before correction of the distortion, corresponding to the coordinates generated by the interpolating-position generating unit.

6. The image processing apparatus according to claim 5, wherein the interpolating-coordinate generating unit further comprises a selector that selects either of the coordinates generated by the interpolating-position generating unit or the coordinates obtained by the distortion-correcting-coordinate converting unit, and outputs the selected coordinates to the interpolation calculating unit.

7. The image processing apparatus according to claim 6, wherein the distortion-correcting-coordinate converting unit obtains coordinates in the image before correcting the distortion, corresponding to the coordinates generated by the interpolating-position generating unit, by using a predetermined correcting formula including a polynomial obtained by linearly combining the integer power of the distance from the center of distortion to the interpolating position.

8. The image processing apparatus according to claim 7, wherein the polynomial includes a term of a high degree of the distance, which is higher than the second degree.

9. The image processing apparatus according to claim 8, wherein the image processing unit further comprises another image processing unit other than the distortion correction processing unit, and the distortion-correcting-coordinate converting unit outputs, to the other image processing unit, information on the distance from the center of distortion to the interpolating position.

10. The image processing apparatus according to claim 9, wherein the above-described another image processing unit comprises at least one of a shading correcting unit, a low-pass filter processing unit, and an edge-emphasis processing unit.

11. The image processing apparatus according to claim 7, wherein the image processing unit further comprises another image processing unit other than the distortion correction processing unit, and the distortion-correcting-coordinate converting unit outputs, to the other image processing unit, information on the distance from the center of distortion to the interpolating position.

12. The image processing apparatus according to claim 11, wherein the above-described another image processing unit comprises at least one of a shading correcting unit, a low-pass filter processing unit, and an edge-emphasis processing unit.

13. The image processing apparatus according to claim 5, wherein the distortion-correcting-coordinate converting unit obtains coordinates in the image before correcting the distortion, corresponding to the coordinates generated by the interpolating-position generating unit, by using a predetermined correcting formula including a polynomial obtained by linearly combining the integer power of the distance from the center of distortion to the interpolating position.

14. The image processing apparatus according to claim 13, wherein the polynomial includes a term of a high degree of the distance, which is higher than the second degree.

15. The image processing apparatus according to claim 14, wherein the image processing unit further comprises another image processing unit other than the distortion correction processing unit, and the distortion-correcting-coordinate converting unit outputs, to the other image processing unit, information on the distance from the center of distortion to the interpolating position.

16. The image processing apparatus according to claim 15, wherein the above-described another image processing unit comprises at least one of a shading correcting unit, a low-pass filter processing unit, and an edge-emphasis processing unit.

17. The image processing apparatus according to claim 13, wherein the image processing unit further comprises another image processing unit other than the distortion correction processing unit, and the distortion-correcting-coordinate converting unit outputs, to the other image processing unit, information on the distance from the center of distortion to the interpolating position.

18. The image processing apparatus according to claim 17, wherein the above-described another image processing unit comprises at least one of a shading correcting unit, a low-pass filter processing unit, and an edge-emphasis processing unit.

* * * * *

UNITED STATES PATENT AND TRADEMARK OFFICE
CERTIFICATE OF CORRECTION

| | | |
|---|---|---|
| PATENT NO. | : 7,636,498 B2 | Page 1 of 1 |
| APPLICATION NO. | : 10/558994 | |
| DATED | : December 22, 2009 | |
| INVENTOR(S) | : Hideaki Furukawa et al. | |

It is certified that error appears in the above-identified patent and that said Letters Patent is hereby corrected as shown below:

ON THE TITLE PAGE

At Item (52), after the words "U.S. Cl.", delete "382/303" and insert therefor --382/275000--.

Signed and Sealed this

Thirteenth Day of July, 2010

David J. Kappos
*Director of the United States Patent and Trademark Office*